(12) United States Patent
Ueda et al.

(10) Patent No.: US 10,980,177 B2
(45) Date of Patent: Apr. 20, 2021

(54) COMBINE HARVESTER COMPRISING YIELD CORRECTOR FOR CORRECTING MINIMAL SECTION YIELD

(71) Applicant: Kubota Corporation, Osaka (JP)

(72) Inventors: Mao Ueda, Sakai (JP); Yoshimasa Ando, Sakai (JP); Kazuhiro Takahara, Sakai (JP); Mitsuhiro Seki, Sakai (JP)

(73) Assignee: Kubota Corporation, Osaka (JP)

( * ) Notice: Subject to any disclaimer, the term of this patent is extended or adjusted under 35 U.S.C. 154(b) by 306 days.

(21) Appl. No.: 15/580,011

(22) PCT Filed: Jun. 17, 2016

(86) PCT No.: PCT/JP2016/068106
§ 371 (c)(1),
(2) Date: Dec. 6, 2017

(87) PCT Pub. No.: WO2017/038207
PCT Pub. Date: Mar. 9, 2017

(65) Prior Publication Data
US 2018/0132419 A1    May 17, 2018

(30) Foreign Application Priority Data

Sep. 2, 2015  (JP) ................................ 2015-173105
Sep. 18, 2015 (JP) ................................ 2015-185363
Sep. 25, 2015 (JP) ................................ 2015-188481

(51) Int. Cl.
*A01D 41/127*   (2006.01)
*A01D 41/12*    (2006.01)
(Continued)

(52) U.S. Cl.
CPC ..... *A01D 41/1272* (2013.01); *A01D 41/1208* (2013.01); *A01D 41/1275* (2013.01); *A01F 12/46* (2013.01); *A01F 12/60* (2013.01)

(58) Field of Classification Search
CPC ............. A01D 41/1208; A01D 41/127; A01D 41/1271; A01D 41/1272; A01D 41/1274;
(Continued)

(56) References Cited

U.S. PATENT DOCUMENTS 5,327,708 A * 7/1994 Gerrish .................. A01F 12/00
                                                    56/1
5,487,702 A * 1/1996 Campbell ............... A01F 12/50
                                                    460/7
(Continued)

FOREIGN PATENT DOCUMENTS

EP   3272205 A1   1/2018
JP   5692712 A    7/1981
(Continued)

*Primary Examiner* — Adam J Behrens
(74) *Attorney, Agent, or Firm* — The Webb Law Firm

(57) ABSTRACT

A combine harvester includes a conveyance mechanism for conveying grains obtained by a thresher for threshing grain culms reaped from a field to a grain tank, a measurer (340) for measuring the amount of grain conveyed to the grain tank as a conveyed yield, a yield assignment calculator (631) for calculating a minimal section yield, which is a yield per minimal section, by assigning the conveyed yield to a minimal section in the field, a grain conveyance state detector (632) for detecting a grain conveyance state of the conveyance mechanism (7), a yield corrector (633) for correcting the minimal section yield in accordance with the grain conveyance state, and a yield distribution data generator (661) for generating yield distribution data that represents a yield distribution in the field, based on the minimal section yield.

6 Claims, 20 Drawing Sheets

(51) Int. Cl.
*A01F 12/46* (2006.01)
*A01F 12/60* (2006.01)

(58) Field of Classification Search
CPC ............ A01D 41/1275; A01D 41/1276; A01D 41/1277; A01F 12/46; A01F 12/60
See application file for complete search history.

(56) References Cited

U.S. PATENT DOCUMENTS

| | | | | |
|---|---|---|---|---|
| 5,878,371 | A * | 3/1999 | Hale | A01B 79/005 702/5 |
| 5,959,218 | A * | 9/1999 | Strubbe | A01D 41/1271 73/861.71 |
| 6,192,664 | B1 * | 2/2001 | Missotten | A01D 41/1274 460/1 |
| 6,460,008 | B1 * | 10/2002 | Hardt | A01D 41/1272 460/1 |
| 6,687,616 | B1 * | 2/2004 | Peterson | A01B 79/005 702/5 |
| 7,089,117 | B2 * | 8/2006 | Maertens | A01B 79/005 702/5 |
| 9,506,786 | B2 * | 11/2016 | Strnad | A01D 61/00 |
| 10,149,435 | B2 * | 12/2018 | Inoue | A01B 79/005 |
| 2002/0091458 | A1 * | 7/2002 | Moore | A01B 79/005 700/110 |
| 2002/0133309 | A1 * | 9/2002 | Hardt | A01D 41/1272 702/129 |
| 2004/0194442 | A1 * | 10/2004 | Maertens | A01B 79/005 56/10.2 R |
| 2014/0174199 | A1 * | 6/2014 | Strnad | A01D 41/1272 73/861.73 |
| 2015/0293029 | A1 * | 10/2015 | Acheson | G01N 33/0098 356/51 |
| 2016/0066507 | A1 | 3/2016 | Inoue et al. | |
| 2016/0084813 | A1 * | 3/2016 | Anderson | A01D 41/127 702/5 |
| 2016/0143221 | A1 * | 5/2016 | Koch | A01D 41/1272 73/861.73 |
| 2017/0115862 | A1 * | 4/2017 | Stratton | A01D 41/1271 |
| 2017/0193613 | A1 * | 7/2017 | Romier | G06Q 50/02 |

FOREIGN PATENT DOCUMENTS

| | | |
|---|---|---|
| JP | 8112030 A | 5/1996 |
| JP | 8266146 A | 10/1996 |
| JP | 2001269049 A | 10/2001 |
| JP | 200580582 A | 3/2005 |
| JP | 2005278539 A | 10/2005 |
| JP | 200867668 A | 3/2008 |
| JP | 2011 223959 A | 11/2011 |
| JP | 2014212749 A | 11/2014 |
| JP | 201565884 A | 4/2015 |

\* cited by examiner

COMBINE HARVESTER COMPRISING YIELD CORRECTOR FOR CORRECTING MINIMAL SECTION YIELD

CROSS-REFERENCE TO RELATED APPLICATIONS

This application is the United States national phase of International Application No. PCT/JP2016/068106 filed Jun. 17, 2016, and claims priority to Japanese Patent Application Nos. 2015-173105, 2015-185363, and 2015-188481, filed Sep. 2, 2015, Sep. 18, 2015, and Sep. 25, 2015, respectively the disclosures of which are hereby incorporated in their entirety by reference.

TECHNICAL FIELD

The present invention relates to a combine harvester.

BACKGROUND ART

[1] A conventional combine harvester that can reap grain culms from a field while travelling, accumulate grains obtained by threshing the reaped grain culms, in a grain tank, and calculate the yield of harvested grain is described in JP 2014-212749A.

This combine harvester includes a yield calculator for receiving, in a yield measurement container, at least some of the grains supplied to the grain tank and calculating a unit-travel yield, which is the yield per unit of travel, based on accumulation time required to accumulate a predetermined volume of grains and traveling speed. It is also disclosed that traveling data, such as a traveling position, and the unit-travel yield are assigned to a field section obtained by dividing the field, and field distribution information regarding the yield is generated. At this time, a predetermined amount of time passes from when grain culms are reaped by a reaper and subjected to a threshing process until when they are thrown into the yield measurement container. For this reason, the amount by which the combine harvester moves during this time is considered when determining the position in the field in which the grains whose yield has been calculated were reaped. Specifically, the position in the field that corresponds to the calculated yield is corrected based on a processing time taken from when grain culms were detected by a stem sensor provided in the reaper until when grains obtained from these grain culms reached the yield measurement container, and on the traveling speed during this time.

[2] A conventional combine harvester that can reap grain culms from a field while travelling, accumulate grains obtained by threshing the reaped grain culms, in a grain tank, and calculate the yield of harvested grains in minimal sections, which are generated by dividing the field into a plurality of sections, is described in JP 2005-278539A.

This combine harvester includes a yield measurer for measuring the flow rate of hulls that are discharged to the grain tank for storing threshed hulls (grains), and a machine body position measuring means for measuring the position of the machine body in the field. The yield measured by the yield measurer indicates the yield at a time point that came before this yield measurement time point (the time point at which the yield was measured by the yield measurer) by a predetermined amount of time. This predetermined time is a delay time obtained by adding the time required to convey grains in the thresher, the time required to convey reaped grain culms to the thresher, and the like. Considering this, the yield measured by the yield measurer is corrected to obtain the yield at a position in the field that is the machine body position at a past time point corresponding to this delay time.

[3] A conventional combine harvester is disclosed in JP Application P2015-055137. This combine harvester includes a threshing apparatus, a grain tank that is arranged adjacent to the threshing apparatus, and a grain-lifting apparatus for conveying grains collected by the threshing apparatus to the grain tank. The grain-lifting apparatus includes a vertical conveyor that extends upward from a lower portion of the threshing apparatus, and a horizontal conveyor for discharging the grains from a discharge port formed at its leading end portion into the grain tank, the horizontal conveyor extending horizontally from an upper end portion of the vertical conveyor and being inserted in an upper portion, on one side in the front-rear direction, of a side wall of the grain tank.

The horizontal conveyor includes a base end-side screw portion that is close to the vertical conveyor, and a blade portion that is supported by a rotary shaft extending from a screw shaft of the screw portion on a leading end side distant from the vertical conveyor, protrudes in a radial direction from the rotary shaft, and rotates to throw grains from the discharge port toward the other side in the front-rear direction in the grain tank.

Conventionally, in this kind of combine harvester, the blade portion is provided on the rotary shaft in a state of extending radially in a radius direction, and a throwing face of the blade portion is configured as a flat face that faces in a direction perpendicular to the rotary shaft.

PRIOR ART DOCUMENTS

Patent Literatures

Patent Literature 1: JP 2014-212749 A
Patent Literature 2: JP 2005-278539 A
Patent Literature 3: JP Application P2015-055137

SUMMARY OF THE INVENTION

Problem to be Solved by the Invention

[1] A problem corresponding to the Background Art [1] is as follows.
With the conventional combine harvester described in JP2014-212749A, the yield in a field section can be accurately calculated if the time from when grain culms are reaped by the reaper and subjected to the threshing process until when they reach the yield measurement container is always fixed. However, in a combine harvester, when grains obtained by threshing grain culms with the thresher are conveyed to the grain tank, the conveyance of the grains by the conveyance mechanism may fail due to an unexpected drop in engine speed, an increase in the load due to conveyance performed by the conveyance mechanism, or the like. Restoration from such a conveyance failure is usually realized in a short period of time. However, at the beginning of this failed conveyance, the conveyance amount to the grain tank decreases, and ultimately the conveyance amount to the grain yield measurer decreases. In contrast, when the failed conveyance is restored, grains that have been temporarily left in the thresher due to the decrease in the conveyance amount are conveyed together with new threshed grains. Accordingly, the conveyance amount to the grain tank per unit of time increases, and ultimately the conveyance amount to the measurer increases. As a result, assignment of the yield to minimal sections formed by minutely dividing the field becomes inaccurate, and consequently the yield distribution in the field becomes inaccurate.

In view of the foregoing situation, there is a demand for a combine harvester that can obtain a more accurate yield distribution in a field.

[2] A problem corresponding to the Background Art [2] is as follows.

As for the combine harvester described in JP2005-278539A, the start of reaping of grain culms at which the measured yield value increases from zero and the end of reaping at which the measured yield value falls to zero are not considered. An error occurs if the yields of grains harvested at reaping timings that are not chronologically continuous are assigned to positions in the field. In other words, in the case where the machine body position at past time point corresponding to the aforementioned delay time is in a region near a reaping-starting point or a reaping-end point, the yield assigned to such a position contains an error. Accordingly, this error needs to be considered in order to obtain an accurate yield distribution.

In view of the foregoing situation, there is a demand for a combine harvester that can readily correct the errors in the yield measurement at the start and the end of reaping of grain culms that occur in the conventional yield measurement.

[3] A problem corresponding to the Background Art [3] is as follows.

With the combine harvester in JP Application P2015-055137, grains that have been conveyed to the horizontal conveyor are sent out with speed toward the rotary shaft side at the leading end along the screw shaft within a casing, due to the rotation of the screw portion. The grains are then thrown out into the grain tank by the blade portion that rotates together with the rotary shaft.

Accordingly, the grains have a velocity vector in a direction along the screw shaft (hereinafter, "feed-in velocity vector" for convenience) at the time point where the grains are fed from the screw portion into a rotation area of the blade portion.

With the aforementioned conventional combine harvester, the throwing face of the blade portion is configured as a flat face that faces in a direction perpendicular to the rotary shaft. Accordingly, the velocity vector to be exerted on grains by the throwing face (hereinafter, "feed-out velocity vector" for convenience) is oriented in a perpendicular direction relative to the throwing face, i.e. a direction perpendicular to the rotary shaft.

The throwing direction of the grains that fly out from the blade portion is the direction of the resultant force of the aforementioned two velocity vectors, and accordingly, with the conventional combine harvester, the throwing direction of the grains is one-sided toward the feed-in velocity vector from the direction perpendicular to the rotary shaft.

As a result, the distribution of the thrown grains is one-sided toward an opposing side wall that opposes the side wall of the grain tank in which the horizontal conveyor is inserted, and becomes unbalanced.

For this reason, there is a demand for a combine harvester that solves this problem and can throw grains in a less one-sided manner within the grain tank.

Solution to the Problem

[1] A solution corresponding to the problem [1] is as follows.

A combine harvester according to the present invention includes: a thresher for threshing grain culms reaped from a field; a conveyance mechanism for conveying grains obtained by the thresher to a grain tank; a measurer for measuring an amount of grain conveyed to the grain tank as a conveyed yield; a yield assignment calculator for calculating a minimal section yield, which is a yield per minimal section, by assigning the conveyed yield to a minimal section of the field; a grain conveyance state detector for detecting a grain conveyance state of the conveyance mechanism; a yield corrector for correcting the minimal section yield in accordance with the grain conveyance state; and a yield distribution data generator for generating yield distribution data representing a yield distribution in the field, based on the minimal section yield.

With the thus-configured combine harvester, even if a conveyed yield temporarily decreases due to grains remaining in the thresher as a result of the conveyance state of the conveyance mechanism for conveying grains from the thresher to the grain tank deteriorating, and the conveyed yield temporarily further increases due to restoration of the conveyance mechanism after that, the yield is accurately assigned to the minimal sections of the field by correcting the minimal section yield based on the result of detecting the grain conveyance state of the conveyance mechanism.

Deterioration of the conveyance state of the conveyance mechanism includes a malfunction of a power source (e.g. if the power source is an engine, deterioration of the conveyance ability of the conveyance mechanism due to a drop in the engine speed), and also includes, if a power transmission mechanism in the conveyance mechanism is a belt, deterioration of the conveyance ability of the belt due to a slip. Accordingly, the grain conveyance state detector has a function of detecting the grain conveyance state of the conveyance mechanism, such as a function of detecting the engine speed or a function of detecting a slip of the conveyance mechanism. The grain conveyance state detector may also be configured to detect deterioration of the conveyance ability of the conveyance mechanism, e.g. a drop in the conveyance speed, using other methods.

A drop in the grain conveyance speed of the conveyance mechanism (deterioration of the conveyance ability) will cause a calculation result that is smaller than the actual minimal section yield, and will cause, conversely, a calculation result that is larger than the actual minimal section yield at the time of restoration from the drop in the conveyance speed. To solve this problem, in a preferable embodiment of the present invention, the grain conveyance state detector detects a drop in a conveyance speed of the conveyance mechanism and restoration from the drop in the conveyance speed, and the yield corrector corrects a decrease in the minimal section yield due to the drop in the conveyance speed and an increase in the minimal section yield due to the restoration from the drop in the conveyance speed.

A specific correction method used by the yield corrector is to replace a decreased minimal section yield and an increased minimal section yield with an average minimal section yield obtained by averaging the decreased minimal section yield and the increased minimal section yield. Thus, a large error is resolved, and a more accurate minimal section yield can be obtained.

To sequentially assign the conveyed yield to the thresher that is calculated during harvest travel to each minimal section of the field, the vehicle position needs to be accurately measured. An accurate vehicle position can be relatively readily obtained using position measurement using satellite navigation such as a GPS (global positioning system). However, a vehicle position measuring point of satellite navigation is the position of an antenna, but the antenna is arranged on a cabin ceiling where satellite beams can be readily received, and is far from the reaping position. For this reason, if the vehicle position obtained through satellite navigation is used as-is as the reaping position, a position shift occurs from the actual reaping position.

Accordingly, in a preferable embodiment of the present invention, the yield assignment calculator has a delay correction function of correcting a delay time occurring between a grain culm reaping position and the measurer, and a position shift correction function of correcting a position shift between the grain culm reaping position and a vehicle position measuring point obtained through satellite navigation.

A yield per unit of time can be obtained by obtaining an accumulation time required for a predetermined amount of grain to be accumulated. A yield per unit of travel distance can be obtained by dividing the yield per unit of time by the vehicle speed. Although the method for measuring the yield with a predetermined volume of grains accumulated is similar to measurement using a measurement container and is simple, an accurate yield can be calculated therewith. Accordingly, in a preferable embodiment of the present invention, the measurer calculates the conveyed yield per unit of travel, based on an accumulation time required to accumulate a predetermined volume of grain, and a vehicle speed.

Since grains are conveyed to the grain tank at a relatively large flow rate, if the conveyed yield is measured with the total amount accumulated, the scale of a measurement device therefor will increase. For this reason, it is preferable to employ a method by which a partial flow rate is measured using a small measurement container, and the total flow rate is estimated based on this measurement value. Accordingly, in a preferable embodiment of the present invention, a yield measurement container for temporarily accumulating at least some of the grains supplied to the grain tank is provided, and the measurer measures the accumulation time using the yield measurement container.

[2] A solution corresponding to the problem [2] is as follows.

A combine harvester according to the present invention includes: a reaper for reaping grain culms from a field; a thresher for threshing the grain culms reaped by the reaper; a grain tank for storing grains obtained through the threshing of the thresher; a measurer for measuring, as a unit yield, an amount of grain conveyed to the grain tank while traveling a predetermined travel distance; a yield assignment calculator for calculating a minimal section yield, which is a yield per minimal section, by assigning the unit yield to a minimal section of the field; a reaping checker for outputting a check signal at detection of a start and an end of the reaping of grain culms by the reaper; and a unit yield corrector for correcting the unit yield at the start and the end of the reaping in response to output of the check signal.

In the yield measurement corresponding to the start of reaping of grain culms, the amount (yield) of grain conveyed during the corresponding measurement period increases from zero (at the start of the measurement, there is a period in which the yield is substantially zero). Thus, the unit yield per travel distance decreases. As a result, the yield in a minimal section to which the unit yield that is estimated to be lower is assigned will be low. In the yield measurement corresponding to the end of reaping of grain culms, the yield falls to zero during the corresponding measurement period (there is a period in which the yield is substantially zero during the measurement). Thus, the unit yield per travel distance decreases, or the measurement is discontinued mid-way, and the unit yield is deemed to be zero. As a result, the yield in a minimal section to which this unit yield is assigned will be low. However, with the above-described configuration, the unit yield corresponding to the start of reaping of grain culms and the unit yield corresponding to the end of reaping are corrected based on the check signal that is output at the start of reaping and at the end of reaping. The corrected unit yield is assigned to each minimal section, and as a result, the yield in each minimal section is more accurate.

In a preferable embodiment of the present invention, the reaping checker outputs a first check signal at detection of the start of the reaping of grain culms by the reaper, and outputs a second check signal at detection of the end of the reaping of grain culms by the reaper, and the unit yield corrector uses, as a reaping-start unit yield, which is a unit yield of grain culms that are reaped immediately after the first check signal is output, a unit yield that is obtained subsequently to the reaping-start unit yield, and uses, as a reaping-end unit yield, which is a unit yield of grain culms that are reaped immediately before the second check signal is output, a unit yield that is obtained before the reaping-end yield. With this configuration, with the output of the first check signal serving as a trigger signal, the unit yield corresponding to the start of reaping of grain culms is replaced with the unit yield that is measured next. For this reason, the replacing unit yield does not include a measured yield value that is measured in a measurement period in which the measured yield value increases from zero. Similarly, with the output of the second check signal serving as a trigger signal, the unit yield corresponding to the end of reaping of grain culms is replaced with the unit yield that was measured immediately previously. For this reason, the replacing unit yield does not include a measured yield value that is measured in a measurement period in which the measured yield value falls to zero. As a result, the yield assigned to a corresponding minimal section becomes more accurate.

To accurately assign, to a minimal section of the field, the unit yield of grains reaped in this minimal section, it is necessary to accurately measure the grain culms reaping position, i.e. the vehicle position of the combine harvester. An accurate and simple method for measuring the vehicle position of the combine harvester is to use satellite navigation, which is typified by GPS. However, a vehicle position measuring point obtained through satellite navigation is the position of an antenna for receiving beams from the satellite. Therefore, if the position of the antenna differs from the grain culm reaping position, an error occurs for this difference. Accordingly, in a preferable embodiment of the present invention, the yield assignment calculator has a position shift correction function of correcting a position shift between the grain culm reaping position and a vehicle position measuring point obtained through satellite navigation.

A yield per unit of time can be obtained by obtaining an accumulation time required for a predetermined amount of grain to be accumulated. A yield per unit of travel distance can be obtained by dividing the yield per unit of time by the vehicle speed. Although the method for measuring the yield with a predetermined volume of grains accumulated is similar to measurement using a measurement container and is simple, an accurate yield can be calculated therewith. Accordingly, in a preferable embodiment of the present invention, to simply and accurately measure the unit yield of grains conveyed to the grain tank, the measurer calculates the unit yield per unit of travel based on the vehicle speed and the accumulation time required to accumulate a predetermined volume of grains.

Since grains are conveyed to the grain tank at a relatively large flow rate, if the yield is measured with the total amount accumulated, the scale of a measurement device therefor will increase/be large. For this reason, a method is preferable by which a partial flow rate is measured using a small measurement container, and the total flow rate is estimated based on this measurement value. Accordingly, in a preferable embodiment of the present invention, a yield measurement container for temporarily accumulating at least some of the grains supplied to the grain tank is provided, and the measurer measures the accumulation time using the yield measurement container.

[3] As solution corresponding to the problem [3] is as follows.

A feature of a combine harvester according to the present invention lies in that a combine harvester includes: a threshing apparatus; a grain tank arranged adjacent to the threshing apparatus; and a grain-lifting apparatus for conveying grains collected by the threshing apparatus to the grain tank, wherein the grain-lifting apparatus comprises a vertical conveyor extending upward from a lower portion of the threshing apparatus, and a horizontal conveyor for discharging grains from a discharge port formed at a leading end portion thereof into the grain tank, the horizontal conveyor extending horizontally from an upper end portion of the vertical conveyor and inserted into an upper portion, on one side in a front-rear direction, of a side wall of the grain tank, the horizontal conveyor includes a screw portion on a base end side close to the vertical conveyance portion, and a blade portion that rotates to throw grains from the discharge port toward the other side in the front-rear direction in the grain tank, the blade portion being supported by a rotary shaft extending from a screw shaft of the screw portion and protruding in a radially outward direction from the rotary shaft on a leading end side distant from the vertical conveyor, and a throwing face of the blade portion tilts toward the side wall side.

According to the present invention, since the throwing face of the blade portion tilts toward the side wall, the aforementioned feed-out velocity vector is also oriented in a direction toward the side wall of the grain tank.

Accordingly, the throwing direction, which is the direction of the resultant force of the feed-in velocity vector and the feed-out velocity vector can be brought close to, or can be made parallel to, a direction perpendicular to the rotary shaft, compared with the conventional cases.

As a result, the thrown grains can be prevented from being displaced one-sided toward the opposing side wall within the grain tank, and can be accumulated in a balanced distribution state.

In the present invention, it is preferable that a peripheral portion of the rotary shaft is provided with a stay portion for attachably and detachably supporting the blade portion, and the stay portion is located on a side opposite to the throwing face relative to the blade portion.

With this configuration, since the stay portion for attachably and detachably supporting the blade portion is provided in the peripheral portion of the rotary shaft, only the blade portion can be removed from the rotary shaft. Originally, the blade portion continuously comes into contact with grains due to the throwing operation, and therefore soon wears out and requires maintenance. This maintenance operation can be carried out with the blade portion removed, and can accordingly be carried out efficiently in a broad operation space.

If the blade portion is badly worn, this can be simply dealt with by only replacing the blade portion while leaving the rotary shaft as it is, and a reduction in component costs can be achieved.

Since the stay portion is located on the side opposite to the throwing face relative to the blade portion, the stay portion can be prevented from coming into contact with grains by the blade portion.

As a result, it is easier to prevent the stay portion from being worn by grains, and a further reduction in component costs can be achieved.

In the present invention, it is preferable that an angle adjuster for changing a tilt angle of the throwing face is provided so as to span the blade portion and the stay portion.

With this configuration, in the case of changing the tilt angle of the throwing face, the tilt angle can be readily changed by operating the angle adjuster.

Examples of cases of changing the title angle of the throwing face include a case where the ratio between the feed-in velocity vector and the feed-out velocity vector changes, and a case of intentionally changing the throwing direction.

Incidentally, examples of cases where the ratio between the feed-in velocity vector and the feed-out velocity vector changes include a case where there has been a change in the type of grains to be thrown, the yield, or specifications such as the rotational speed of the rotary shaft.

In the present invention, it is preferable that an opening portion from which the grains can be taken out downward is provided in an intermediate portion, in a longitudinal direction, of a casing of the horizontal conveyor, and a sensor for temporarily receiving the grains taken out from the casing and detecting a grain state is provided below the opening portion within the grain tank.

With this configuration, it is possible to take out some of the grains that have been fed into the grain tank through the casing of the horizontal conveyor, downward from the opening portion that is provided in the intermediate portion of the casing in the longitudinal direction, and to detect the grain state using the sensor with the grains temporarily received.

Accordingly, the grain state can be detected in parallel with the conveyance of grains on a grain conveyance path that extends from the base end side of the casing to the leading end side thereof, without stopping this conveyance.

Examples of the grain state to be detected include the yield of grain per unit of time, water content value, protein value, and the like, which can be used to collect yield data and collect taste data, for example.

Note that the length of the horizontal conveyor increases as a result of providing the aforementioned opening portion, the sensor below the opening portion, and the like, and the position of the blade portion, which is provided on the leading end side of the horizontal conveyor is also, accordingly, brought closer to the side wall on the side distant from the vertical conveyor, and the position of the blade portion is biased. However, as mentioned above, the throwing face of the blade portion tilts toward the side wall on the side close to the vertical conveyor. As a result, it is possible to prevent the thrown grains from being dispersed in a one-sided manner within the grain tank, and to realize a further value-added combine harvester.

In the present invention, it is preferable that an outer diameter size of a leading end-side casing portion of a casing of the horizontal conveyor, the leading end-side casing portion being on the blade portion side, is larger than an outer diameter size of a base end-side casing portion of the casing, the base end-side casing portion being on the screw portion side, and an outer diameter size of the blade portion is larger than an outer diameter size of the screw portion, a chamfered portion is formed at a corner of a peripheral portion of the blade portion on the screw portion side, and a leading end portion of the base end-side casing portion extends up into the leading end-side casing portion on the base end side, and an inner diameter portion side of the blade portion relative to the chamfered portion is inserted in the leading end portion of the base end-side casing portion.

With this configuration, the outer diameter size of the leading end-side casing portion of the casing of the horizontal conveyor on the blade portion side is made larger than the outer diameter size of the base end-side casing portion of the casing on the screw portion side. Accordingly, the space within the leading end-side casing portion has a larger volume per unit of length than that of the space within the base end-side casing portion, and grains that are fed by the screw portion can be received in a sufficiently large space.

Since the outer diameter size of the blade portion is made larger than the outer diameter size of the screw portion, a blade portion having a wider throwing face can be formed within a large-diameter space within the leading end-side casing portion.

A wide throwing face allows more grains to be thrown. In addition, a large outer diameter size of the blade portion makes the throwing speed at the peripheral portion faster, allowing grains to be thrown more strongly and increasing comprehensive throwing performance.

The chamfered portion is formed at a corner of the peripheral portion of the blade portion on the screw portion side. The leading end portion of the base end-side casing portion extends up to the inside of the leading end-side casing portion on the base end side. Also, the inner diameter side of the blade portion relative to the chamfered portion is inserted into the leading end portion of the base end-side casing portion. As a result, a wide blade portion that is inserted into the leading end portion of the base end-side casing portion can be configured while avoiding interference between the blade portion and the leading end portion of the base end-side casing portion, with the chamfered portion, even if the blade is arranged in a tilted manner.

Accordingly, grains that are fed into the leading end-side casing portion from the screw portion can be received more quickly, and more grains can be thrown more strongly into the space within the grain tank.

In the present invention, it is preferable that the horizontal conveyor is inserted in an upper front portion of the side wall of the grain tank.

With this configuration, since the horizontal conveyor is inserted in the upper front portion of the side wall of the grain tank, the horizontal conveyor can be arranged along an edge of the front wall of the grain tank, and the space that expands up to a rear wall in the grain tank can be used more efficiently as a grain accumulation space.

Other features and advantageous effects achieved thereby will be apparent by reading the following descriptions with reference to the attached drawings.

EMBODIMENTS OF THE INVENTION

First Embodiment

Figure 1:
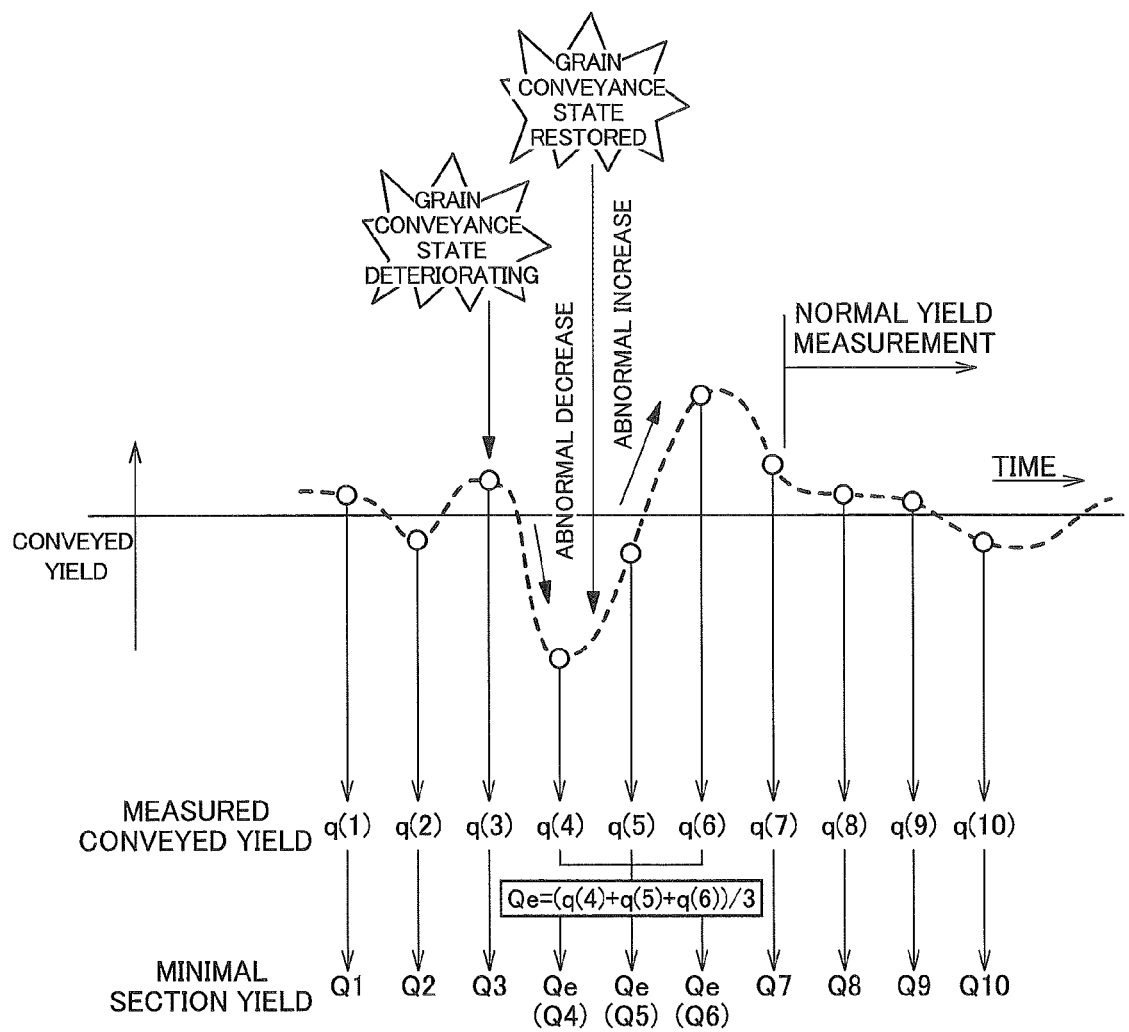
FIG. 1 is a diagram showing a first embodiment, and is an illustrative diagram showing a basic principle of yield measurement when a conveyance abnormality has occurred.

Before describing a specific embodiment of the combine harvester, a basic principle of yield measurement when a conveyance abnormality has occurred will be described using FIG. 1.

The combine harvester that is envisioned here reaps grain culms of wheat, rice, or the like while traveling in a field, and conveys grains obtained by a thresher using a conveyance mechanism to accumulate them in a grain tank. At this time, in this combine harvester, the amount of grain conveyed to the grain tank during reaping travel, i.e. a conveyed yield is measured by a measurer. Furthermore, the measured conveyed yield is assigned to a minimal section, which is obtaining by minutely dividing the field, and a minimal section yield, which is a conveyed yield per minimal section, is calculated. Yield distribution data, which represents a yield distribution in the field, is generated using this minimal section yield. The generated yield distribution data is used to visualize the yield distribution through a monitor or a printer.

However, there may be a case where some trouble occurs in the conveyance mechanism, and a short-term malfunction occurs in the conveyance of grains from the thresher to the grain tank. Such a malfunction occurs when a power source (e.g. engine) of the conveyance mechanism is under a large load, or when the conveyance mechanism itself is under a large load. If this malfunction causes a drop in the conveyance speed of the conveyance mechanism, and resultantly causes deterioration of the conveyance ability, the conveyed amount abnormally decreases in a short period, and grains remain in the thresher. Upon restoration from this malfunction, the grains remaining in the thresher are also conveyed at this point, and as a result, the conveyed amount abnormally increases in a short period of time. In FIG. 1, successive changes in the conveyed yield of grains, including changes when the grain conveyance state thus deteriorates and recovers, are depicted in a graph.

While grains are sequentially conveyed to the grain tank, the conveyed yield thereof is measured at predetermined measurement timings. The measured conveyed yields are assigned to corresponding minimal sections of the field, and minimal section yields are calculated. In FIG. 1, chronological measurement timings are indicated by variable suffixes, which are numbers of 1 to 10. The conveyed yields measured at these measurement timings are denoted as $q(1)$ to $q(10)$, and the minimal section yields are denoted as $Q1$ to $Q10$. Note that, usually, the measured conveyed yield and minimal section yield are not in a 1:1 relation, and one minimal section yield is obtained by integrating several measured conveyed yields. Furthermore, in the case where the conveyed yield is obtained by measuring some of the conveyed grains, this partial conveyed yield needs to be multiplied by a coefficient to obtain the original conveyed yield. However, to simplify the description, it is assumed that the relation between the measured conveyed yield and minimal section yield is 1:1, and the coefficient is 1.

$q(4)$ denotes the conveyed yield measured when the conveyed yield abnormally decreases due to deterioration of the grain conveyance state. $Q4$ denotes the minimal section yield at the time of this abnormal decrease, and is a value lower than their original (actual) value since grains remain in the thresher. $q(5)$ and $q(6)$ denote the conveyed yields measured while the conveyed yield abnormally increases due to restoration of the grain conveyance state. $Q5$ and $Q6$ denote the minimal section yields at the time of this abnormal increase, and are values higher than their original (actual) values since the grains that have remained in the thresher are also conveyed. At this time, an abnormal decrease suddenly occurs, and an abnormal increase that occurs in the process of restoring from this decrease takes time, comparatively. The measured conveyed yields $q(4)$, $q(5)$, and $q(6)$ and the minimal section yields $Q4$, $Q5$, and $Q6$, which are values different from their original values, need to be corrected. There are various methods for this correction employing statistical approaches, whereas averaging is employed in this example. That is to say, an average value of the conveyed yield measured when the conveyed yield abnormally decreases due to deterioration of the grain conveyance state and the conveyed yields measured when the conveyed yield abnormally increases due to restoration of the grain conveyance state is used as a correction value for the measured conveyed yields, and resultantly as a correction value for the minimal section yields. Although, in the above example, the number of minimal section yields to be corrected is three, namely $Q4$, $Q5$, and $Q6$, the number may also be less than three, or may also be more than four. Since temporal behavior of the abnormal decrease and abnormal increase in the measured conveyed yields due to deterioration of the grain conveyance state is also different depending on specifications or the like of the combine harvester, the conveyed yields and minimal section yields to be corrected are determined based on knowledge acquired through experiments or the like. Furthermore, although the abnormal measured conveyed yields are subjected to averaging when the correction value is obtained using averaging, averaging to which conveyed yields obtained before and after those abnormal measured conveyed yields are also subjected may also be employed.

The grain conveyance state of the conveyance mechanism, such as deterioration of the grain conveyance state or recovery of the grain conveyance state, can be detected based on information from one or more sensors in a device state detection sensor group for detecting the state of various devices installed in this combine harvester. For example, if belt transmission is used for power transmission in the conveyance mechanism, deterioration of the grain conveyance state (failed conveyance) due to a belt slip can be detected based on detection information regarding the number of rotations of a transmission shaft on a power-receiving side that is driven by the belt.

Figure 2:
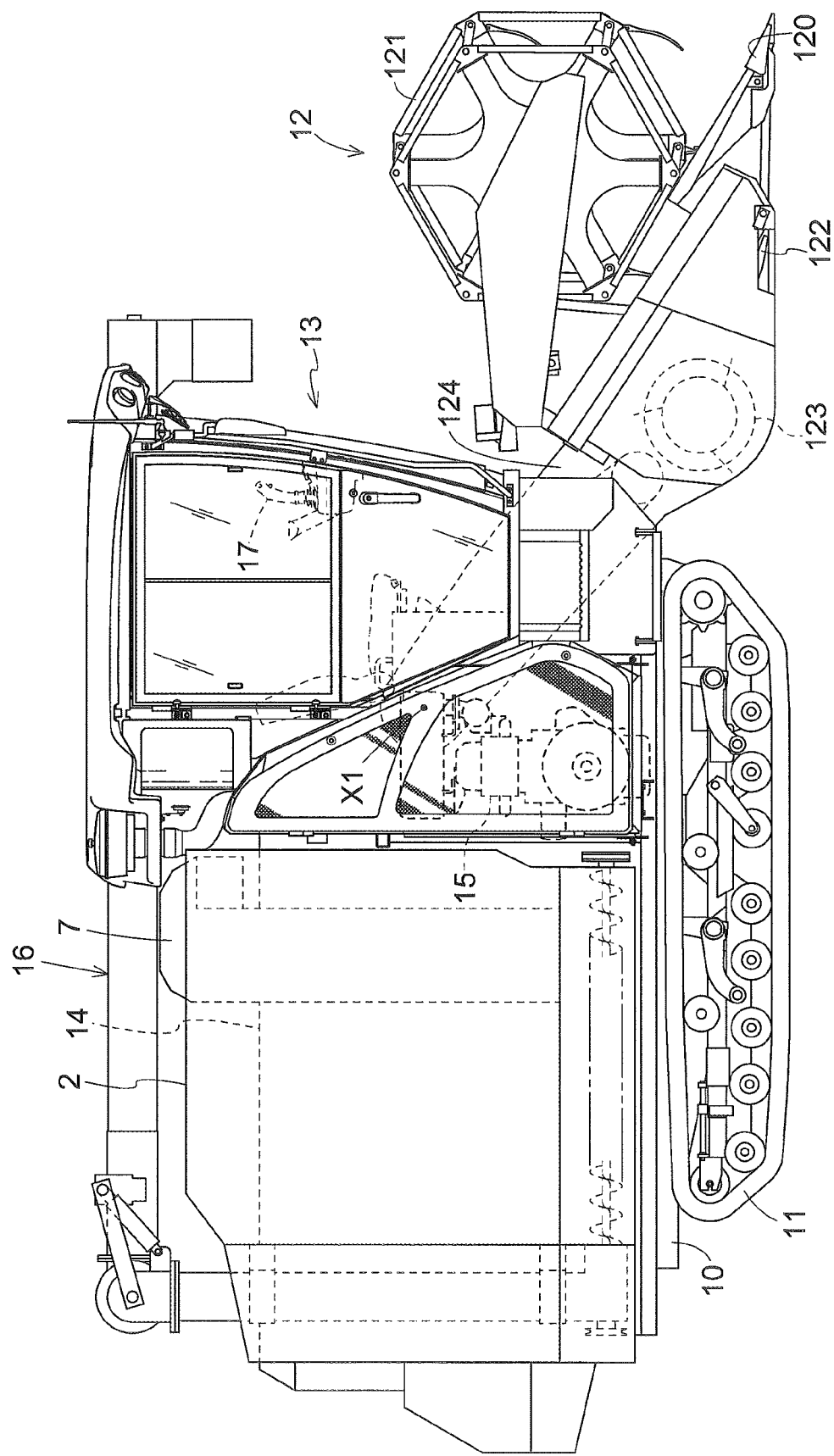
FIG. 2 is a diagram showing a configuration shared by the first and second embodiments (the same applies to FIGS. 3 to 7), and is a side view of a normal combine harvester serving as an example of a combine harvester.
Figure 3:
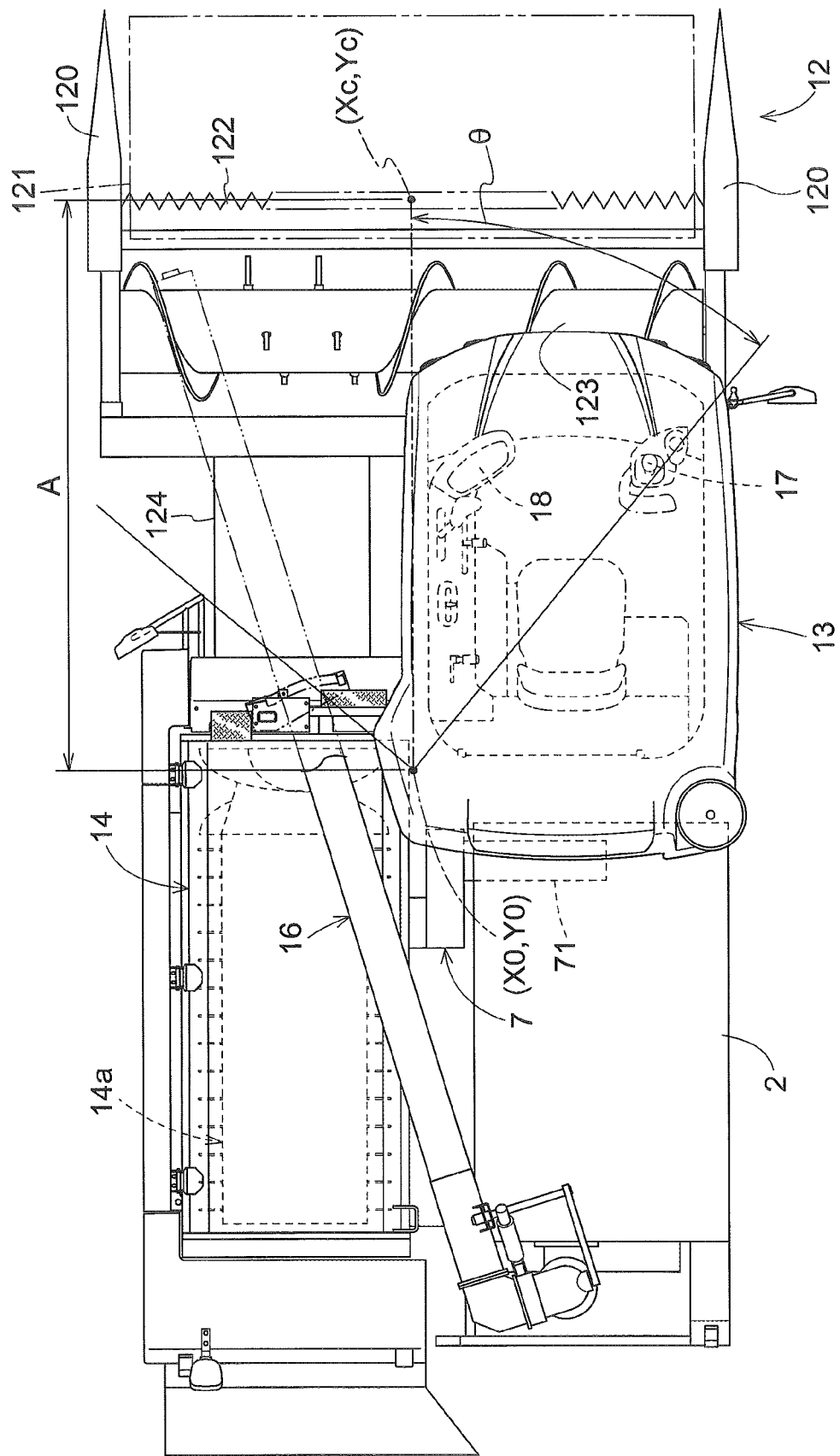
FIG. 3 is a plan view of the combine harvester.

Next, a specific embodiment of the combine harvester according to the present invention will be described using the drawings. FIG. 2 is a side view of a normal combine harvester, which is an example of a combine harvester, and FIG. 3 is a plan view thereof. This normal combine harvester is also called a whole culm charging type combine harvester.

The combine harvester includes a body frame 10, which is formed by connecting a plurality of steel materials such as channel-shaped materials and square pipe materials. A pair of left and right crawler traveling apparatuses 11 are installed below the body frame 10. An engine 15 is mounted in a right front portion of the body frame 10, and a cabin-type driving unit 13 is formed thereabove. An operation lever 17, a monitor 18, and the like are arranged in the driving unit 13. A reaper 12 is installed in a front portion of the body frame 10 so as to be able to be raised and lowered. A thresher 14 for threshing whole reaped grain culms that are supplied from the reaper 12 and then thrown therein, a grain tank 2 for accumulating grains supplied from the thresher 14 by the conveyance mechanism 7, and an unloader 16 for discharging the grains accumulated in the grain tank 2 to the outside are installed in a rear portion of the body frame 10.

The reaper 12 is configured to be able to be raised and lowered in an up-down direction around a first horizontal axis X1, which extends in a machine body-horizontal direction. The reaper 12 is in a raised state during a non-harvesting operation, such as when turning around, and is in a lowered state and comes close to the field surface during a harvesting operation. The reaper 12 includes a pair of left and right dividers 120 for dividing planted grain culms, a raking reel 121 for raking the planted grain culms rearward by being driven to rotate, a reaping blade device 122 for reaping the planted grain culms raked by the raking reel 121, an auger drum 123 for feeding rearward the grain culms reaped by the reaping blade device 122, and a feeder 124 for conveying the reaped grain culms fed from the auger drum 123 toward a front end portion of the thresher 14.

The thresher 14 is configured to perform a threshing process on the reaped grain culms supplied from the feeder 124, using a cylinder 14a that is driven to rotate. The grain tank 2 is arranged in a right rear portion on the body frame 10, and is located next to the thresher 14 on the right side and on the rear side of the driving unit 13. The conveyance mechanism 7, which is constituted by a conveyor group for conveying grains from the thresher 14 to the grain tank 2, is arranged between the thresher 14 and the grain tank 2. A terminal portion of the conveyance mechanism 7 is configured as a screw conveyor 71, and is inserted in the grain tank 2.

Figure 4:
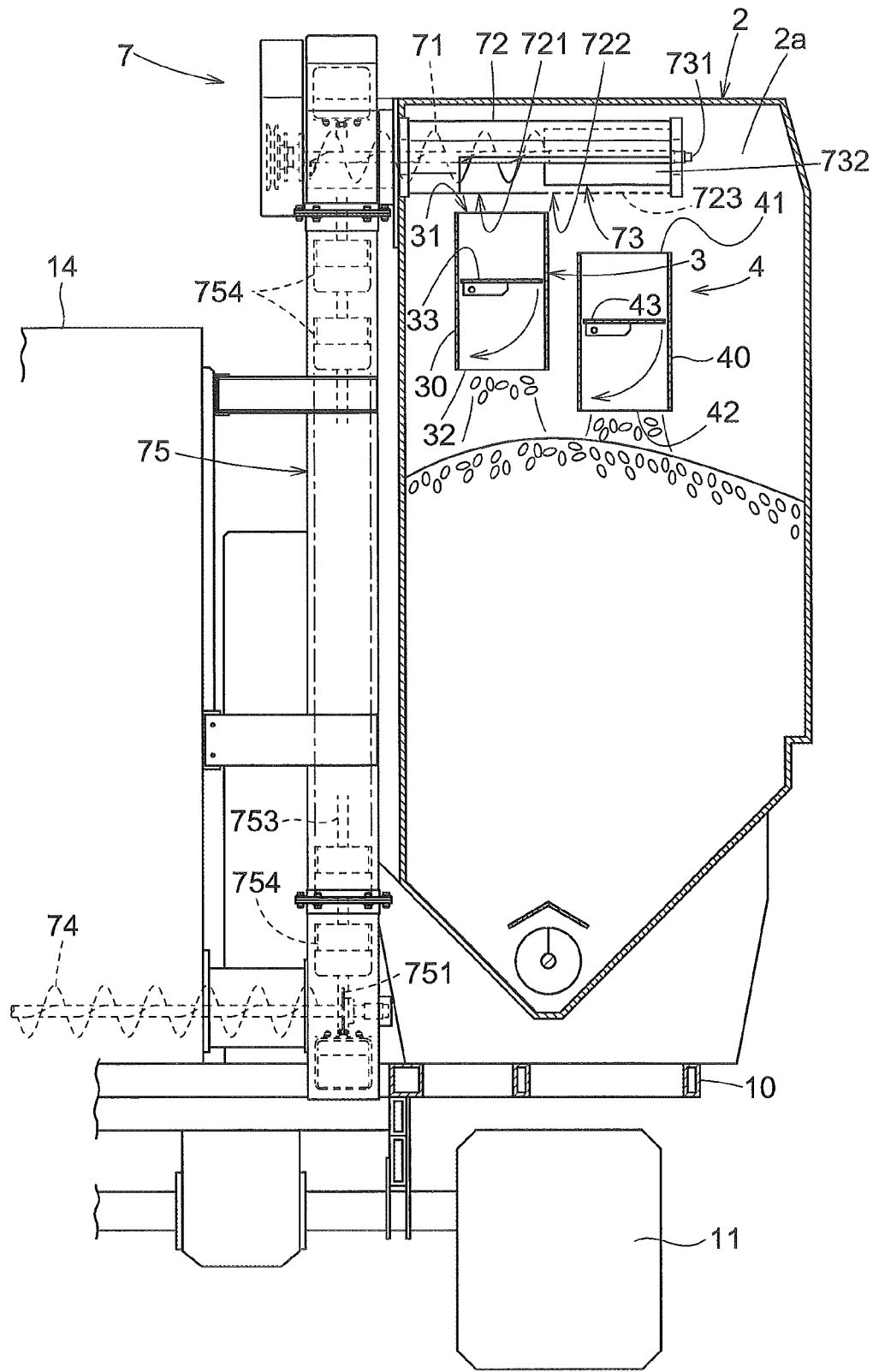
FIG. 4 is a front elevational view of a yield measurement container and a taste measurement container that are attached to the inside of a grain tank in the combine harvester.
Figure 5:
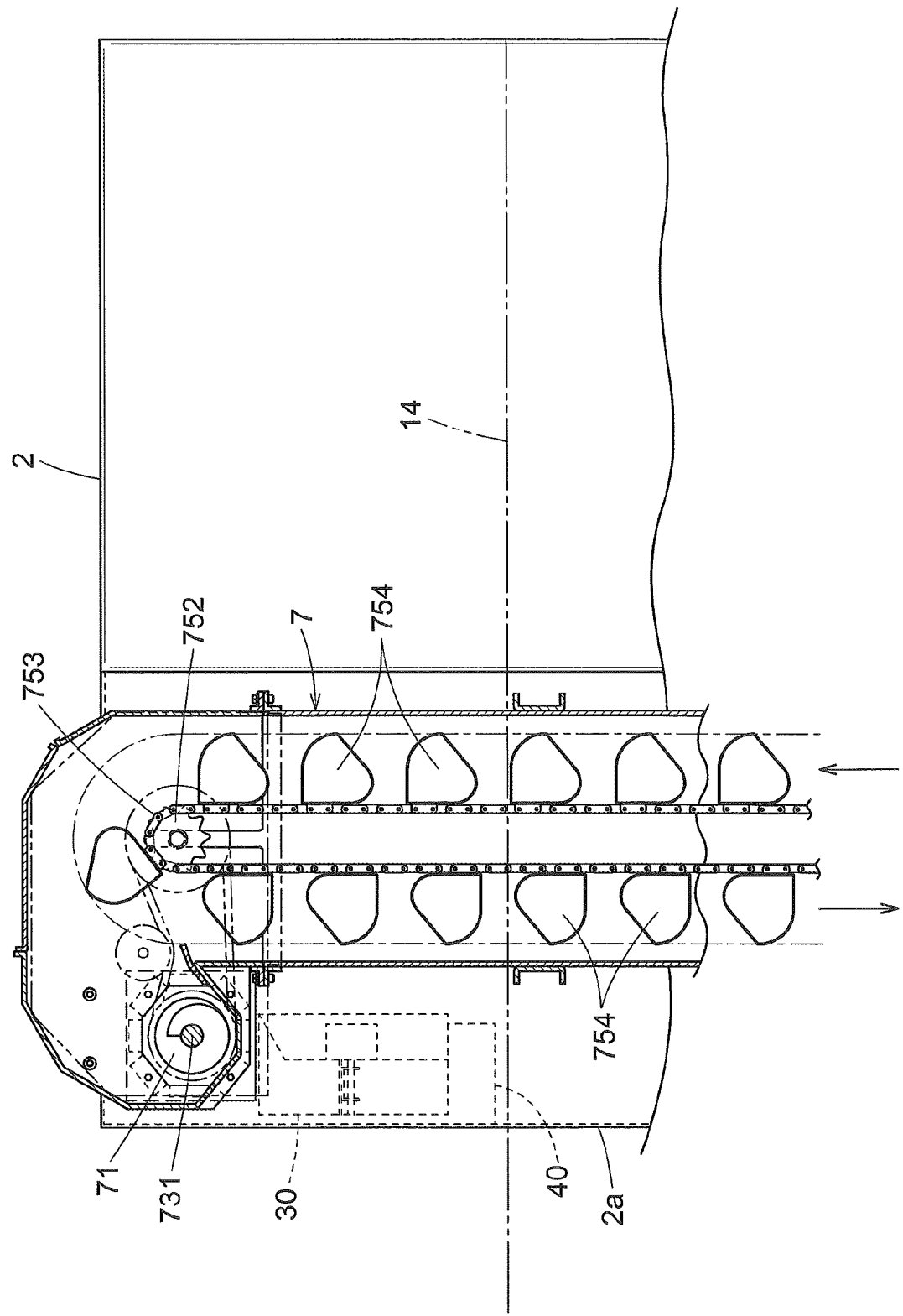
FIG. 5 is a side view of the yield measurement container and the taste measurement container that are attached to the inside of the grain tank.

As shown in FIGS. 4 and 5, the conveyance mechanism 7 is constituted by a horizontal feed conveyor 74, a lifting conveyor 75, the screw conveyor 71, and impellers 73. The horizontal feed conveyor 74, which is install in the left-right direction at the bottom of the thresher 14, is connected, at its conveyance terminal portion, to the lifting conveyor 75 of a bucket type. The lifting conveyor 75 is a bucket conveyor in which a plurality of buckets 754 are attached with fixed gaps on the outer circumferential side of an endless rotary chain 753 that is wound around a driving sprocket 751 and a driven sprocket 752. Engine power is transmitted to the conveyance mechanism 7 via a belt transmission apparatus (not shown). The number of rotations of a rotary power system of the conveyance mechanism 7, such as the driving sprocket 751, is detected by a rotation detection sensor. Accordingly, for example, deterioration of the grain conveyance state in the case where the number of rotations of the driving sprocket 751 has suddenly dropped due to an unexpected factor, such as a slip of the belt transmission apparatus, can be detected by evaluating a signal from this rotation detection sensor. Similarly, the number of rotations of the driving sprocket 751 having been restored to its normal state can also be detected by evaluating a similar signal from the rotation detection sensor.

The lifting conveyor 75 is connected, at its conveyance terminal portion, to the screw conveyor 71. The screw conveyor 71 is enclosed by a housing 72 whose cross-sectional shape is octagonal (which may also have another polygonal shape or a circular shape). A pair of impellers 73, which rotate integrally with the screw conveyor 71, are arranged at a terminal portion of the screw conveyor 71.

Note that the second embodiment will describe a grain culm reaping position (Xc, Yc), a vehicle position measuring point (X0, Y0), a distance A(m) by which the grain culm reaping position (Xc, Yc) is distanced from the vehicle position measuring point (X0, Y0), on the immediately front side of the machine body, and a tilt θ of the vehicle traveling direction shown in FIG. 3.

As shown in FIG. 4, in this embodiment, a yield measurement container 30 in a yield measurement apparatus 3 for measuring the yield of grains conveyed by the conveyance mechanism 7 and a taste measurement container 40 in the taste measurement apparatus 4 for measuring the taste of the grains conveyed by the conveyance mechanism 7 are arranged within the grain tank 2. The yield measurement apparatus 3 measures the yield per time based on the time for which a predetermined amount of grain is accumulated in the yield measurement container 30. Similarly, the taste measurement apparatus 4 measures grain components, such as water content and protein, through spectral measurement on the grains that are temporarily accumulated in the taste measurement container 40.

As shown in FIGS. 4, 5, 6, and 7, the yield measurement container 30 and the taste measurement container 40 are attached to the inside of the grain tank 2, next to each other in an upper portion of a front wall 2a of the grain tank 2. The yield measurement container 30 is a cylindrical container. A first receiving port (yield receiving port) 31 for receiving grains is formed at an upper end portion of the yield measurement container 30. A first discharge port (yield discharge port) 32 for discharging the received grains is formed at a lower end of the yield measurement container 30. A first shutter 33 is provided between the first receiving port 31 and the first discharge port 32. The first shutter 33 temporarily accumulates the grains received through the first receiving port 31, and discharges the accumulated grains through the first discharge port 32 after a predetermined amount of grain has been accumulated. Similar to the yield measurement container 30, the taste measurement container 40 is also a cylindrical container. A second receiving port 41 for receiving grains is formed at an upper end portion of the taste measurement container 40. A second discharge port 42 for discharging the received grains is formed at a lower end of the taste measurement container 40. A second shutter 43 is provided between the second receiving port 41 and the second discharge port 42. The second shutter 43 temporarily accumulates the grains received through the second receiving port 41, and discharges the accumulated grains through the second discharge port 42 after a predetermined amount of grain has been accumulated.

In the housing 72 of the screw conveyor 71 that is provided at an uppermost portion of the front wall 2a of the grain tank 2, a first opening portion 721 and a second opening portion 722, which serve as grain discharge ports of the conveyance mechanism 7, are provided next to each other in the grain conveyance direction. The yield measurement container 30 is arranged so that the first receiving port 31 is located below the first opening portion 721. The taste measurement container 40 is arranged so that the second receiving port 41 is located below the second opening portion 722. The screw conveyor 71 extends up to the upper side of the first opening portion 721, and half or more of the grains conveyed by the screw conveyor 71 is discharged through the first opening 721.

The impellers 73 for receiving the grains conveyed by the screw conveyor 71 each have a rotary shaft 731 that extends in the direction in which the housing 72 that serves as a grain supply duct extends, i.e. in the axial direction of the screw conveyor 71, and a plurality of blade bodies 732 that radially extend from this rotary shaft 731 in the radius direction. A wire net 723, which serves as a porous member, is stretched over the second opening portion 722. Grains that are pushed out by the blade bodies 732 pass through the wire net 723, and some of them are supplied to the taste measurement container 40 through the second receiving port 41. The wire net 723, which exhibits a grain-discriminating effect due to its pore size, suppresses mixing of rachises and branches of grain culms or the like in the grains supplied to the taste measurement container 40, preventing those rachises and branches from inhibiting transmission of light.

Figure 6:
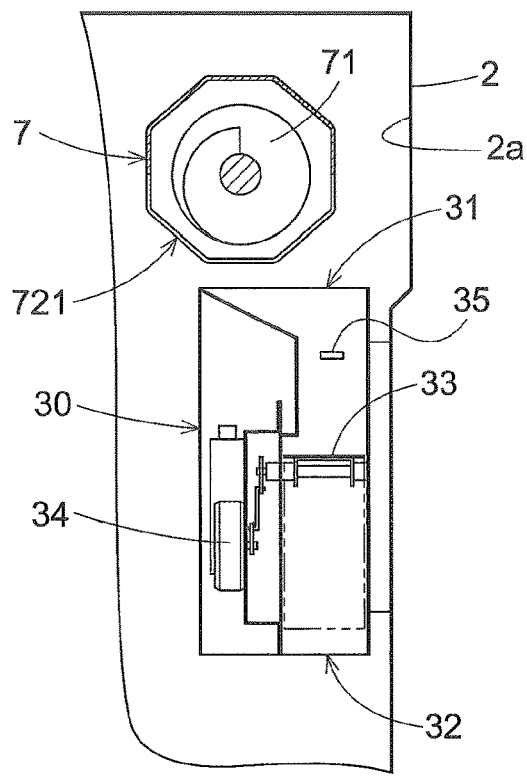
FIG. 6 is a cross-sectional view of the yield measurement container attached to the inside of the grain tank.

As shown in FIG. 6, the first shutter 33, which is a grain shutter in the yield measurement container 30, can be pivoted by an actuator 34 between a closed posture for interrupting passage of grains and an open posture for allowing passage of grains.

Grains that fall from the first opening portion 721 enter the yield measurement container 30 through the first receiving port 31. While the first shutter 33 assumes the closed posture, these grains are accumulated on the first shutter 33. When the amount of accumulated grains reaches a predetermined amount, it is detected by a proximity sensor 35. At this time, the time from when the first shutter 33 pivots to assume the closed posture until the accumulation of the predetermined amount of grain is detected by the proximity sensor 35 is measured. The yield of the predetermined amount of grain that has been conveyed per time is thus obtained, and the yield per unit of travel distance can be calculated based on the thus-measured time and the vehicle speed. By repeating this calculation process and performing integration, the yield corresponding to a travel trajectory of the combine harvester is calculated.

Figure 7:
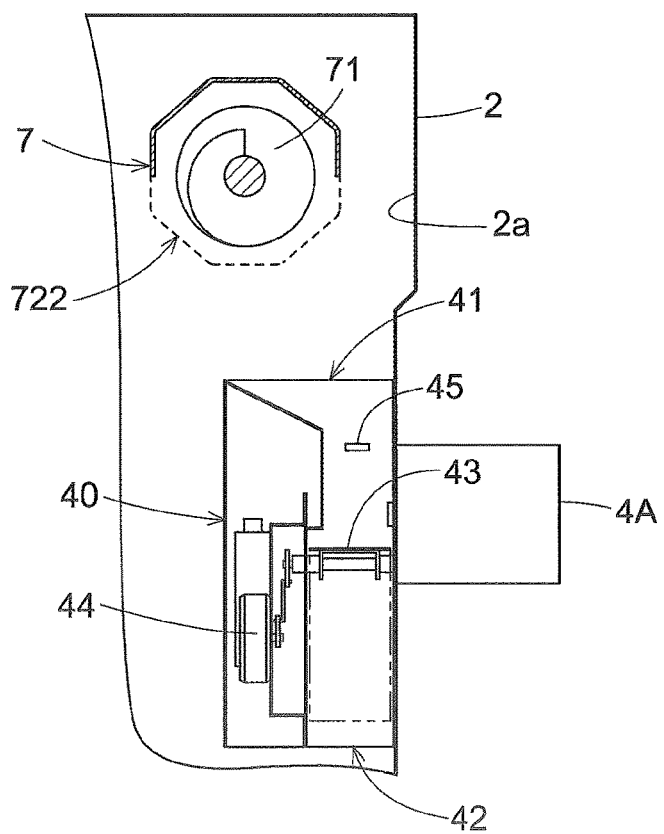
FIG. 7 is a cross-sectional view of the taste measurement container attached to the inside of the grain tank.

As shown in FIG. 7, the second shutter 43, which is a grain shutter in the taste measurement container 40, can also be pivoted by an actuator 44 between a closed posture for interrupting passage of grains and an open posture for allowing passage of grains. Note that, in this embodiment, the actuators 34 and 44 for the first shutter 33 and the second shutter 43 are constituted by electric motors. Grains that fall from the second opening portion 722 enter the taste measurement container 40 through the second receiving port 41. While the second shutter 43 assumes the closed posture, these grains are accumulated on the second shutter 43 in the closed posture. When it is detected by a proximity sensor 45 that the accumulated grains have reached a predetermined height, the taste of the grains is measured. In this embodiment, a taste measurement unit 4A, which constitutes the taste measurement apparatus 4, includes a light transmitting/receiving head that protrudes into the taste measurement container 40, and employs a spectrometry method for measuring a spectrum of light that returns after passing through grains. The taste measurement unit 4A can measure a grain water content value and a protein value. The taste measurement unit 4A outputs a taste value that includes at least one of the measured values related to water content and protein, which are grain components, a computed taste value that is obtained based on a ratio between those components, and the like. After the taste measurement is finished, the second shutter 43 pivots to assume the open posture, and the accumulated grains are discharged. Subsequently, the second shutter 43 pivots to assume the closed posture, and taste measurement for grains that are accumulated next starts. By repeating this process, taste values corresponding to the travel trajectory of the combine harvester are calculated.

Figure 8:
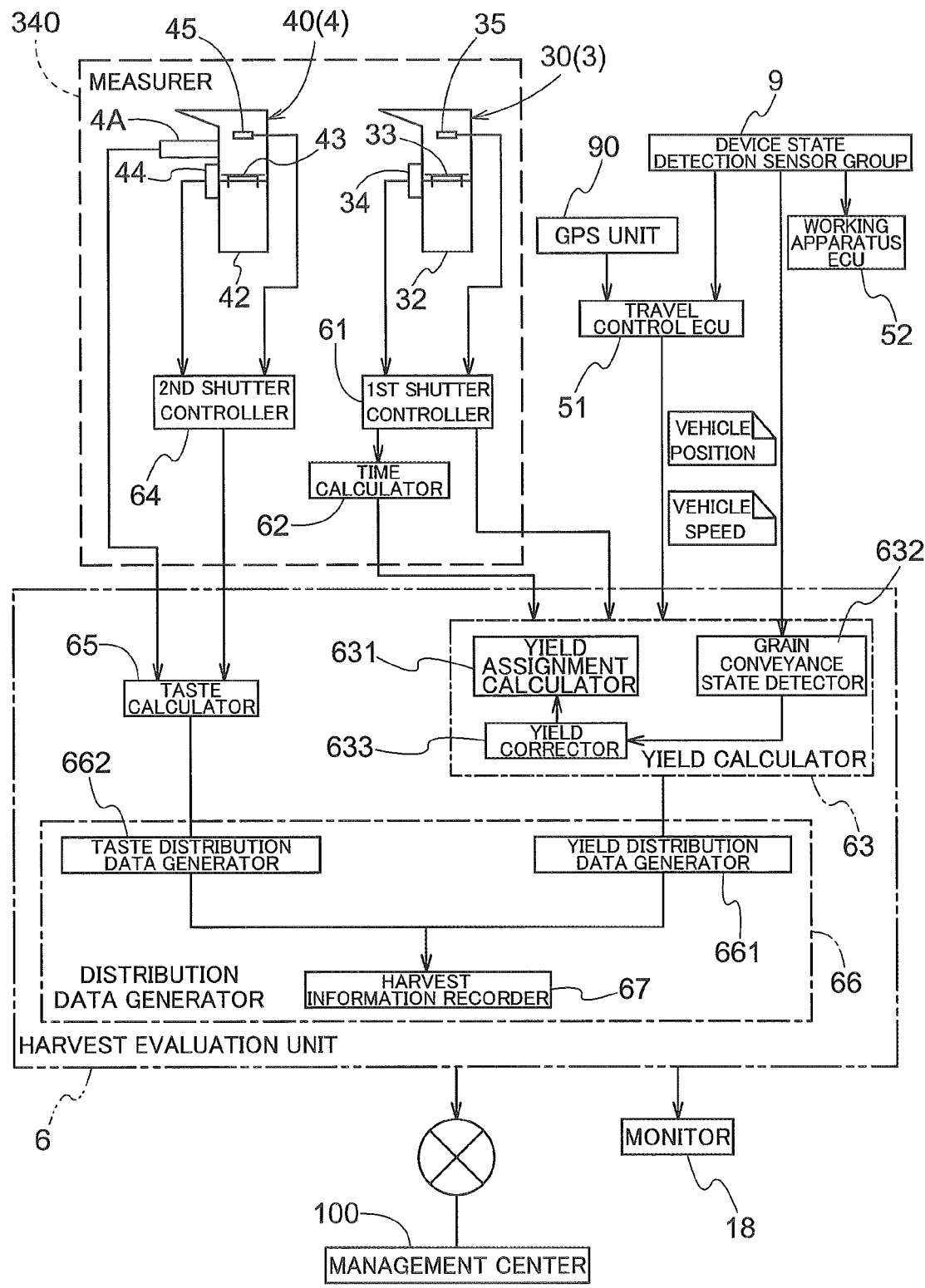
FIG. 8 is a diagram showing the first embodiment (the same applies to FIG. 9), and is a functional block diagram showing functional units in a control system associated with taste calculation and yield calculation in the combine harvester.

FIG. 8 shows a functional block diagram for illustrating a control system associated with calculation of the yield and taste per minimal section (per unit of travel) of this field. A travel control ECU (electrical control unit) 51, a working apparatus ECU 52, and a distribution data generator 66 are provided as an electronic control unit constituting this control system so as to be able to exchange data with each other through an in-vehicle LAN (local area network) or other data communication line.

The travel control ECU 51 is an ECU for handling various kinds of control information regarding vehicle travel. For example, the travel control ECU 51 has a function of generating travel control information based on detection signals regarding the vehicle speed, travel distance, travel trajectory (travel position), engine speed, fuel consumption, and the like that are acquired from a device state detection sensor group 9 via the in-vehicle LAN. In addition, the travel control ECU 51 has a function of acquiring the vehicle position from a GPS unit 90, which is an example of a satellite navigation vehicle position measurement unit and is mounted in this combine harvester, and calculating the travel trajectory based on this vehicle position. The working apparatus ECU 52 is an ECU for controlling working apparatuses such as the reaper 12 and the thresher 14, and is connected to the device state detection sensor group 9 in order to acquire detection signals indicating the operation state and working state of various devices constituting the working apparatuses.

In this embodiment, a measurer 340 has a yield measurement function of measuring, as a conveyed yield, the amount of grain conveyed to the grain tank 2 using the yield measurement container 30, and a taste measurement function of measuring the taste (water content and protein component) of the grains conveyed to the grain tank 2 using the taste measurement container 40. The measurer 340 includes, as the yield measurement function, a first shutter controller 61 for opening and closing the first shutter 33, and a time calculator 62, and includes, as the taste measurement function, a second shutter controller 64 for opening and closing the second shutter 43, and a taste measurement unit 4A. The time calculator 62 measures an accumulation time, which is the time taken for a predetermined amount of grain to be accumulated in the yield measurement container 30.

A harvest evaluation unit 6, which receives processed data from various functional units in the measurer 340 and evaluates the yield and taste of grains, includes a yield calculator 63, a taste calculator 65, the distribution data generator 66, and a harvest information recorder 67. The yield calculator 63 calculates a conveyed yield, which is a yield of conveyed grains, based on the accumulation time from the time calculator 62 and the vehicle speed during this accumulation, in the form of a yield per unit of travel. Furthermore, the yield calculator 63 has a function of correcting the yield when the grain conveyance state deteriorates and when the grain conveyance state is restored, as described using FIG. 1. The yield calculator 63 includes a yield assignment calculator 631, a grain conveyance state detector 632, and a yield corrector 633.

The yield assignment calculator 631 calculates a minimal section yield, which is a conveyed yield per minimal section, by assigning a yield per unit of travel (conveyed yield per unit of travel) to a minimal section of the field. The yield assignment calculator 631 has a delay correction function of correcting delay time, which is a grain conveyance time taken from a reaping point to a yield measuring point, and a position shift correction function of correcting a position shift between a grain culm reaping position and a vehicle position measuring point, which is the position of the antenna of the GPS unit 90.

The grain conveyance state detector 632 detects deterioration of the grain conveyance state and restoration of the grain conveyance state, each of which is the grain conveyance state of the conveyance mechanism 7. Necessary detection signals are sent from the device state detection sensor group 9 to the grain conveyance state detector 632. For example, the grain conveyance state detector 632 can detect a drop in the conveyance speed and restoration from the drop in the conveyance speed, based on detection signals from a rotation sensor and a speed sensor that are provided in the conveyance mechanism 7.

The yield corrector 633 employs the method described using FIG. 1 to correct the minimal section yield, which is handled by the yield assignment calculator 631, in accordance with the grain conveyance state. A decrease in the minimal section yield due to a drop in the conveyance speed and an increase in the minimal section yield due to restoration from the drop in the conveyance speed are corrected using an average minimal section yield, which is obtained by averaging the decreased minimal section yield and the increased minimal section yield.

The taste calculator 65 calculates a taste value per minimal section (minimal section taste value), based on a measurement value from the taste measurement unit 4A.

The distribution data generator 66 includes a yield distribution data generator 661 for generating, based on the minimal section yield, yield distribution data that represents a yield distribution in the field, and a taste distribution data generator 662 for generating, based on the minimal section taste value, taste distribution data that represents a taste distribution in the field. At this time, an ID for identifying each minimal section, which is obtained by minutely dividing the field, is assigned to each minimal section yield and each minimal section taste value. Furthermore, the yield distribution data and the taste distribution data are integrated as harvest distribution data, which is temporarily recorded in a memory by the harvest information recorder 67. The recorded harvest distribution data is read out at an appropriate timing, and is displayed on the monitor 18 in the driving unit 13. The harvest distribution data is also transmitted to a management center 100, which is located at a remote place, through a communication line.

A flow of yield measurement performed by the yield measurement apparatus 3 will now be described in detail.

In an initial state where reaping work has not started, the first shutter 33 assumes the open posture. After the reaping operation starts, when a timing at which grains are to be discharged to the grain tank 2 is reached, the first shutter 33 switches to the closed posture, and grains begin to accumulate in the yield measurement container 30. Simultaneously, the time calculator 62 starts measuring time (generation of a count signal). Upon the amount of grain accumulated in the yield measurement container 30 reaching a given amount, the proximity sensor 35 operates, and an appropriate amount detection signal is generated.

With the generation of this appropriate amount detection signal as a trigger, the time measurement performed by the time calculator 62 stops, and the first shutter 33 switches to the open posture. A time measurement value (accumulation time) obtained by the time calculator 62 is the time taken until the given amount of grain is accumulated in the yield measurement container 30. Here, assuming that the given amount is q and the accumulation time is t, the conveyed yield per unit of time is obtained by q/t. Furthermore, assuming that the vehicle speed while the grains to be accumulated are being harvested is v, the conveyed yield per unit of travel distance (yield per unit of travel) is obtained by q/(t*v) Also, assuming that the reaping width (harvesting width) of the reaper 12 is w, the conveyed yield per unit of travel area is obtained by q/(t*v*w), which will be referred to as the yield per unit of travel here.

Similarly to the first shutter 33, in an initial state where reaping operation has not started, the second shutter 43 assumes the open posture. After the reaping operation starts, when a timing at which grains are to be discharged to the grain tank 2 is reached, the second shutter 43 switches to the closed posture, and grains begin to accumulate in the taste measurement container 40. Simultaneously, the time calculator 62 starts measuring time (generation of a count signal). Upon the amount of grain accumulated in the taste measurement container 40 reaching a given amount, the proximity sensor 45 operates, and an appropriate amount detection signal is generated.

With the generation of this appropriate amount detection signal as a trigger, taste measurement is started by the taste measurement unit 4A. A water content value and a protein value are measured through analysis of the wavelength of the light beam radiated to the grains. The measurement time required for the taste measurement is about several seconds to several tens of seconds. After the reaping operation ends, the second shutter 43 switches to the open posture, and the grains in the taste measurement container 40 are discharged from the taste measurement container 40 into the grain tank 2. Upon grains having been discharged from the taste measurement container 40, the second shutter 43 switches to the closed posture based on an instruction from the taste calculator 65 to proceed to the next taste measurement.

If the area of the minimal section and the aforementioned unit of travel area are the same, the minimal section yield and the yield per unit of travel are the same. However, since the predetermined amount (the amount of grain to be accumulated) in the yield measurement container 30 is small, the area of the minimal section that serves as the basis of the yield distribution data is larger than the area of the unit of travel distance in many cases. In that case, the minimal section yield may be obtained by integrating a plurality of successively calculated yields per unit of travel. In the above embodiment, it is assumed that the area of each minimal section is the same as the aforementioned unit of travel area, i.e. the minimal section yield is the same as the yield per unit of travel, to simplify the description. Note that, in practice, it is convenient if the minimal section can be set to have a desired size. A yield distribution having a resolution that is a desired minimal section can be generated by assigning yields per unit of travel to selected minimal sections.

In this embodiment, in order to reduce the computation load when vehicle position coordinates are obtained based on a GPS signal from the GPS unit 90, the computation period, i.e. a GPS sampling period T(see FIG. 9) is set to be long. If the GPS sampling period T is made to be long, the interval between the timings of acquiring obtained vehicle position coordinates becomes long, and the timing of calculating the conveyed yield, which is sequentially calculated due to a reaping harvesting operation, is shifted from the timing of acquiring the vehicle position coordinates. This shift between the timings makes the relation between the harvest position in the field and the yield, i.e. the yield distribution in the field, incorrect. To avoid this problem, the vehicle position coordinates when the conveyed yield is calculated are calculated by linearly interpolating two sets of vehicle position coordinates that are calculated before and after the conveyed yield is calculated. A description will be given below, using FIG. 9, of this computation for linearly interpolating the vehicle position coordinates.

Figure 9:
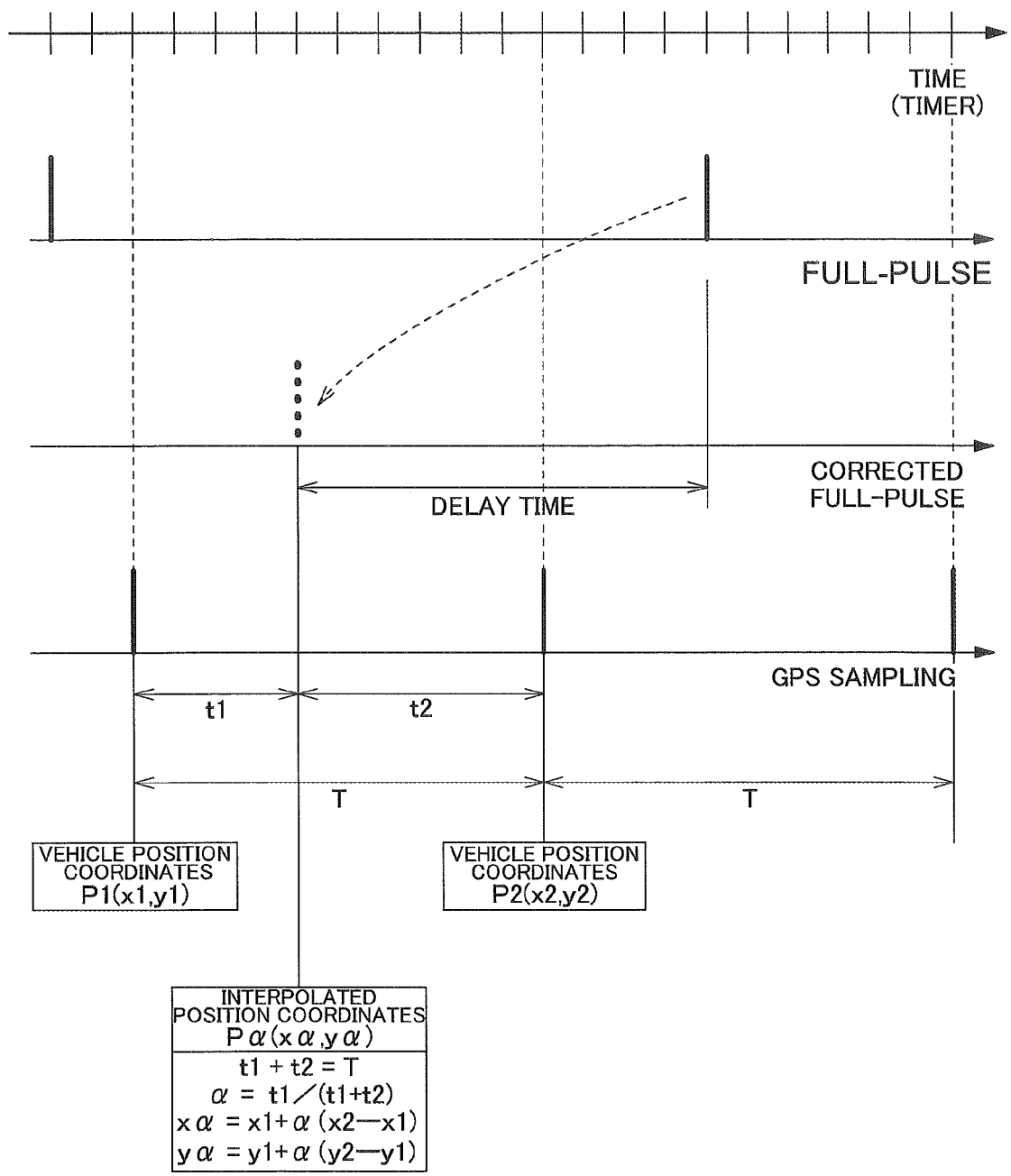
FIG. 9 is an illustrative diagram schematically illustrating obtainment of vehicle position coordinates at the time of yield calculation, by linearly interpolating two sets of vehicle position coordinates that are calculated before and after a time point of yield calculation.

In the example shown in FIG. 9, the interval between GPS sampling timings (thick solid lines), i.e. the GSP sampling period T is longer than an average conveyed yield calculation interval. Note that, here, the conveyed yield calculation timing is deemed to be a timing at which the proximity sensor 35 operates due to the amount of grain accumulated in the yield measurement container 30 reaching the predetermined amount, and an appropriate amount detection signal (full-pulse) is output. In FIG. 9, the conveyed yield calculation timing is denoted as the full-pulse (thick solid lines). A delay time occurs between the grain culm reaping timing and the conveyed yield calculation timing by the grain conveyance time taken for grains to be conveyed from the grain culms reaping position and the yield measurement container 30 in the measurer 340. For this reason, this delay time needs to be corrected. A corrected full-pulse (thick dotted line) in FIG. 9 is obtained by thus correcting the full-pulse. Linear interpolation is performed using two sets of the vehicle position coordinates P1(x1, y1) and P2(x2, y2) obtained through GPS sampling before and after the corrected full-pulse. That is to say, assuming that, as shown in FIG. 9, the time from when the corrected full-pulse is generated until a GPS sampling timing immediately before the corrected full-pulse is generated is t1, and the time from when the corrected full-pulse is generated until a GPS sampling timing immediately after the corrected full-pulse is generated is t2, the interpolated position coordinates Pα(xα, yα) are obtained by the following equations.

$$x\alpha = x1 + \alpha(x2-x1), y\alpha = y1 + \alpha(y2-y1)$$

where $\epsilon t = t1/(t1+t2)$.

Since the combine harvester performs reaping harvesting while substantially traveling in a linear fashion, a satisfactory result can be obtained through such linear interpolation in a linear travel path.

Note that variations of the first embodiment will be listed in "Variations common to First and Second Embodiment" after the following description of the second embodiment.

Second Embodiment

Next, the second embodiment will be described with reference to FIGS. 2 to 7 and 10 to 12. However, the same descriptions of the structures in FIGS. 2 to 7 that are common to the first and second embodiments will be omitted.

Prior to the description of the specific embodiment, a description will be given, using FIG. 10, of a basic principle of correction of a unit yield at the start and end of reaping that is employed in the combine harvester according to the present invention.

The combine harvester that is envisioned here reaps grain culms of wheat or rice while traveling in a field, and conveys grains obtained by a thresher using a conveyance mechanism to accumulate them in a grain tank. At this time, in this combine harvester, the amount of grain conveyed to the grain tank during reaping travel, i.e. a conveyed yield, is measured by a measurer. Furthermore, the measured conveyed yield is assigned to a minimal section, which is obtained by minutely dividing the field, and a minimal section yield, which is a yield per minimal section, is calculated. Yield distribution data, which represents a yield distribution in the field, is generated using this minimal section yield. The generated yield distribution data is used to visualize the yield distribution through a monitor or a printer.

However, during the reaping operation performed by the combine harvester, the aforementioned inconvenience occurs in the measurement of the unit yield at the start and end of reaping of grain culms, and the minimal section yield to which the unit yield is assigned is incorrect. To solve this, correction is performed in the control as will be described below using the diagrams.

First, to perform the reaping operation, the combine harvester lowers the reaper as it starts to travel. Upon the start of reaping being detected through detection of lowering of the reaper or detection of grain culms, a reaping operation check signal is output. Here, a first check signal is output as the reaping operation check signal indicating the start of reaping. Upon the reaping operation being started, grain culms reaped by the reaper are threshed, and grains are conveyed to the grain tank. At least some of the grains conveyed to the grain tank are measured as a yield. Note that, although a predetermined processing time (delay time) is required until grain culms are reaped and grains thereof are measured, this delay time is ignored in FIG. 10 to simplify the diagram and the description thereof. Needless to say, in the actual processes, consideration is given to the delay time taken until the yield of grains from grain culms reaped by the reaper is measured.

Figure 10:
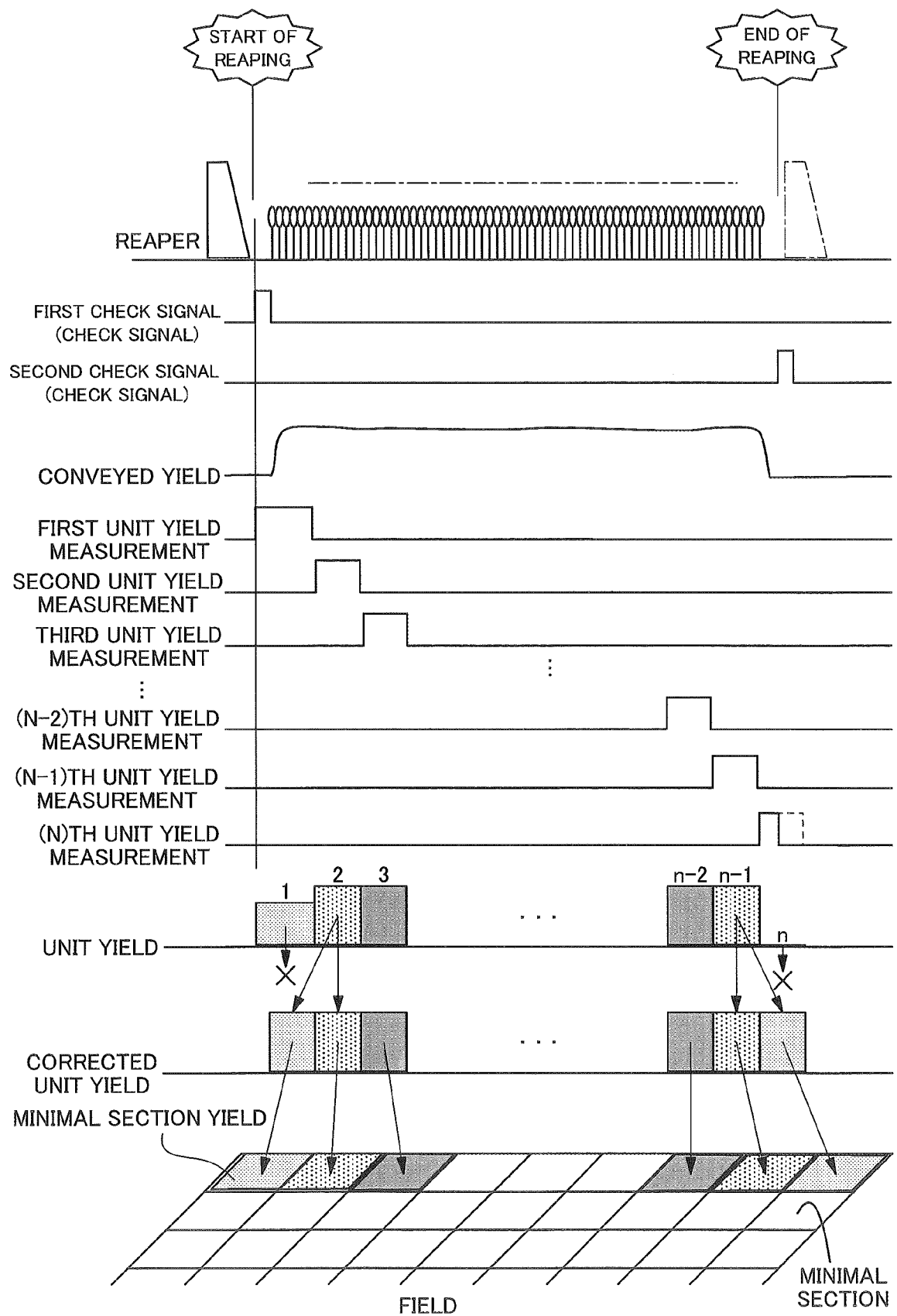
FIG. 10 is a diagram showing the second embodiment (the same applies to FIGS. 11 and 12), and is an illustrative diagram illustrating a basic principle of correction of a unit yield at the start and end of reaping that is employed in the combine harvester according to the present invention.

In the illustration in FIG. 10 where such a delay time is ignored, the initial (first) yield measurement (unit yield measurement) is started at the start of reaping, i.e. when the first check signal is output. Strictly speaking, grains contributing to the first yield measurement include grains from grain culms that are reaped when the first check signal is output. In the yield measurement, the amount of grain conveyed to the grain tank per period of time, or the time required for the amount of grain to reach a predetermined volume is measured, and the yield per travel distance of the combine harvester is obtained as a unit yield based on this measurement result. In the first unit yield measurement, the actual timing of reaping grain culms with the reaper slightly differs from the reaping start timing that is based on the output of the first check signal. For example, when the first check signal is output, grain culms have not yet been actually reaped (non-reaping). Due to such a shift in the timing, the yield per time measured through the first unit yield measurement is lower than the actual value, or the time required to reach the predetermined volume measured through the first unit yield measurement is longer than the actual value. As a result, the measured unit yield is lower than the actual value. Accordingly, the unit yield obtained through the first unit yield measurement needs to be corrected.

At the start of the second and subsequent unit yield measurements, the grain culm reaping process has been continued since the first unit yield measurement, and accordingly an accurate unit yield is measured. For this reason, in the example in FIG. 10, the unit yield obtained through the first unit yield measurement is discarded, and is replaced with the unit yield obtained through the second or subsequent unit yield measurement, e.g. the unit yield obtained through the second unit yield measurement.

Upon reaching the end of grain culms planted in a straight line, the reaper is raised, and the reaping operation ends here. Upon this end of reaping being detected by detecting raising of the reaper, non-detection of grain culms, or the like, a reaping operation check signal is output. Here, a second check signal is output as the reaping operation check signal at the end of reaping. Since the reaping suddenly ends, the unit yield measurement that is being performed at that time is discontinued. In FIG. 10, unit yield measurement is thus discontinued during n-th unit yield measurement. Strictly speaking here again, measurement of the yield including grains from grain culms that are reaped when the second check signal is output is the n-th yield measurement.

Since the n-th unit yield measurement is discontinued, the unit yield obtained therethrough is lower than the actual value, or is deemed to be immeasurable and set to zero. Accordingly, the unit yield obtained through the unit yield measurement at the end of reaping, here, the n-th unit yield measurement, also needs to be corrected. For this reason, in the example in FIG. 10, the unit yield obtained through the n-th unit yield measurement is discarded, and is replaced with the unit yield obtained through unit yield measurement performed before the n-th unit yield measurement, e.g. the unit yield obtained through the (n−1)th unit yield measurement.

Thus-obtained unit yields are assigned to corresponding minimal sections, which are obtained by dividing the field by a predetermined area, recorded as a minimal section yield, and are used to display the yield distribution in the field or the like. Note that, in practice, the unit yield, which is the yield per unit of travel distance (to be exact, the reaping width×the yield per unit of travel distance) and the minimal section yield are not in a 1:1 relation, and one minimal section yield is usually obtained by integrating several unit yields. Furthermore, in the case where the unit yield is obtained by measuring some of the grains conveyed to the grain tank, this partial unit yield needs to be multiplied by a coefficient to obtain the original unit yield. However, to simplify the description, it is assumed that the relation is 1:1.

Figure 11:
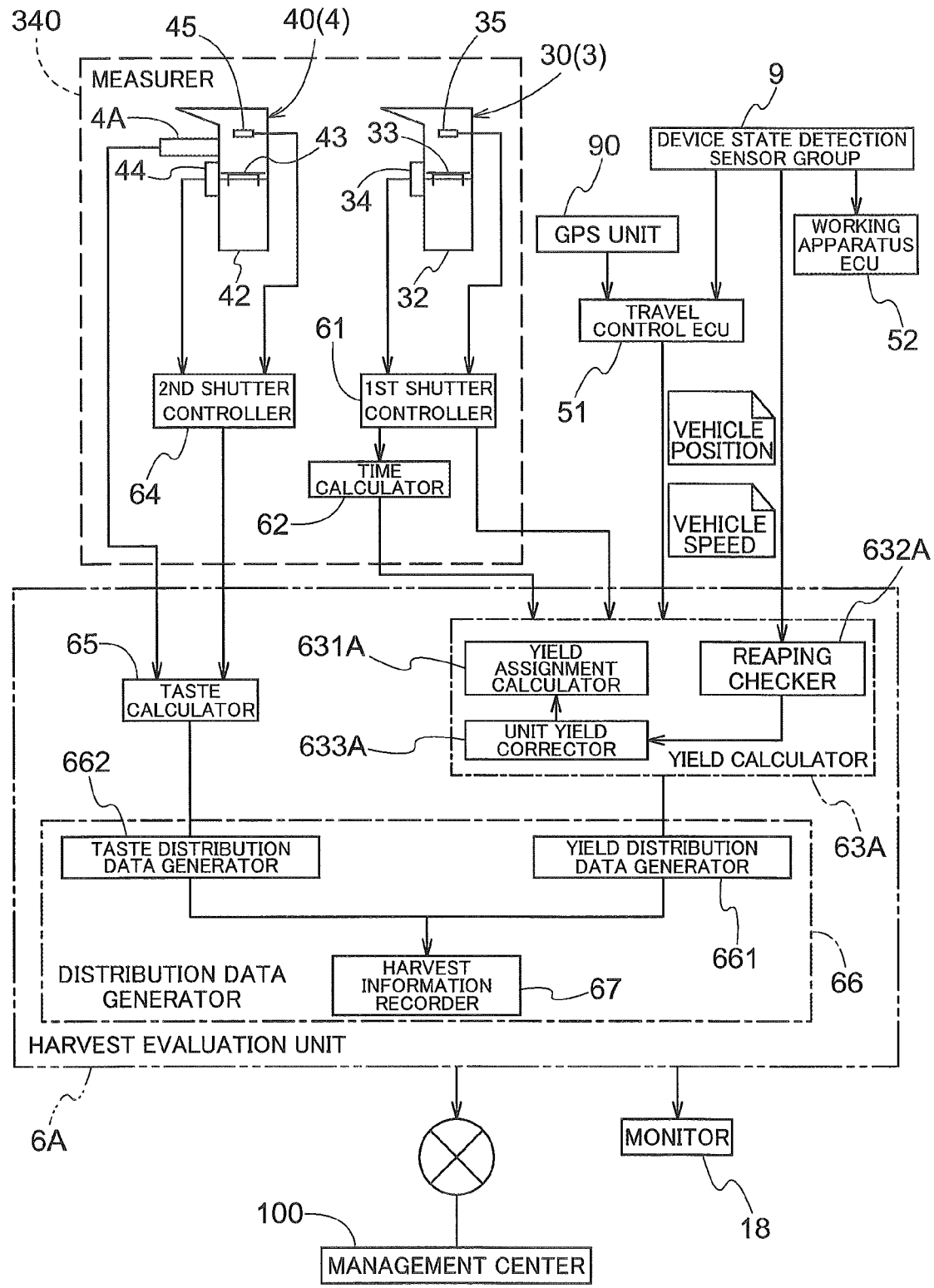
FIG. 11 is a functional block diagram showing functional units in a control system associated with taste calculation and yield calculation in the combine harvester.

FIG. 11 shows a functional block diagram of this combine harvester for illustrating a control system associated with calculation of the yield and taste per minimal section (i.e. per unit of travel) of this field. A travel control ECU 51, a working apparatus ECU 52, and the distribution data generator 66 are provided as an electronic control unit constituting this control system so as to be able to exchange data with each other through an in-vehicle LAN or other data communication line.

The travel control ECU 51 is an ECU for handling various kinds of control information regarding vehicle travel. For example, the travel control ECU 51 has a function of generating travel control information based on detection signals regarding the vehicle speed, travel distance, travel trajectory (travel position), engine speed, fuel consumption, and the like that are acquired from a device state detection sensor group 9 via the in-vehicle LAN. In addition, the travel control ECU 51 has a function of acquiring the vehicle position from a GPS unit 90, which is an example of a satellite navigation vehicle position measurement unit and is mounted in this combine harvester, and calculating the travel trajectory based on this vehicle position. The working apparatus ECU 52 is an ECU for controlling working apparatuses such as the reaper 12 and the thresher 14, and is connected to the device state detection sensor group 9 in order to acquire detection signals indicating the operation state and working state of various devices constituting the working apparatuses. The device state detection sensor group 9 includes a raised/lowered reaper sensor for detecting a lowered state at the start of a harvesting operation of the reaper 12, and a raised state at the end of the harvesting operation.

In this embodiment, a measurer 340 has a yield measurement function of measuring, as a yield, the amount of grain conveyed to the grain tank 2 using the yield measurement container 30, and a taste measurement function of measuring the taste (water content and protein component) of the grains conveyed to the grain tank 2 using the taste measurement container 40. The measurer 340 includes, as the yield measurement function, a first shutter controller 61 for opening and closing the first shutter 33, and a time calculator 62, and includes, as the taste measurement function, a second shutter controller 64 for opening and closing the second shutter 43, and a taste measurement unit 4A. The time calculator 62 measures the accumulation time, which is the time taken for a predetermined amount of grain to accumulate in the yield measurement container 30.

A harvest evaluation unit 6A, which receives processed data from various functional units in the measurer 340 and evaluates the yield and taste of grains, includes a yield calculator 63A, a taste calculator 65, the distribution data generator 66, and a harvest information recorder 67. The yield calculator 63A converts the yield measured by the measurer 340 to the form of a unit yield, which is the yield per unit of travel, based on the accumulation time from the time calculator 62 and the vehicle speed during the accumulation. Furthermore, the yield calculator 63A has a function of correcting the unit yield at the start and end of reaping of grain culms, which was described using in FIG. 10. To realize this function, the yield calculator 63A includes a yield assignment calculator 631A, a reaping checker 632A, and a unit yield corrector 633A. The unit yield corrector 633A corrects the unit yields at the start and end of reaping, in response to the output of the check signals from the reaping checker 632A.

The yield assignment calculator 631A calculates a minimal section yield, which is a yield per minimal section, by assigning a unit yield to a minimal section of the field. The yield assignment calculator 631A has a delay correction function of correcting a delay time, which is a grain conveyance time taken from a reaping point to a yield measuring point, and a position shift correction function of correcting a position shift between a grain culm reaping position (reaping blade position) and a vehicle position measuring point, which is the position of the antenna of the GPS unit 90. The delay correction function uses a value (delay time) that is obtained experimentally in advance.

In FIG. 3, regarding the distance in the field between the grain culm reaping position, which is indicated as a coordinate position (Xc, Yc), and the vehicle position measuring point (GPS antenna position), which is indicated as a coordinate position (X0, Y0), considering that the field surface (earth surface) is an ellipsoid surface, it is necessary to correct the distance that is obtained while deeming the field surface to be a flat surface. The position shift correction function according to this embodiment is constructed with an algorithm that considers the aforementioned correction as well as position information (longitude and longitude information) regarding the vehicle position measuring point and the positional relationship between the reaping point (reaping blade position) of the combine harvester based on the designed dimensions of the combine harvester and the vehicle position measuring point. The following is a description of this algorithm.

Using Hubeny's Formula or distance formula, the distance L between a point P1 and a point P2 on the Earth is expressed as:

$$L^2 = (M \times \Delta Y)^2 + (N \times \cos AY \times \Delta X)^2$$

M: Meridian radius of curvature
N: Prime vertical radius of curvature
ΔY: Latitude difference between two points
ΔX: Longitude difference between two points
AY: Latitude average between two points Then, the latitude difference Y(=LAT_1M) that occurs due to unit distance displacement (1 m) in the meridian direction and the longitude difference X(=LON_1M) that occurs due to unit distance displacement (1 m) in the parallel direction are obtained, based on Hubeny's formula. Since no longitude difference occurs in the case of displacement in the meridian direction, and no latitude difference occurs in the case of displacement in the parallel direction, $$\text{LAT\_1}M = 1/M \quad (1)$$

$$\text{LON\_1}M = 1/((\cos \Delta Y \times N)) \quad (2)$$

Here, if a GRS80 ellipsoid, which is used in the world geodetic system, is employed as the earth shape,
Long radius (equatorial radius: m)=6,378,137.000
Short radius (polar radius: m)=6,335,439.327

$$M = 6{,}335{,}439.327/(1-0.00669438 \times \sin^2 AY)^{3/2} \quad (3)$$

$$N = 6{,}378{,}137.000/(1-0.00669438 \times \sin^2 AY)^{1/2} \quad (4)$$

In view of the fact that the two points (vehicle position measuring point and grain culm reaping position) in the field are very close to each other, compared with the size of the Earth, the latitude average AY between the two points is approximated to the latitude value (LAT_A) of the point (vehicle position measuring point) as follows, using the equations (1) to (4):

$$\text{LAT\_1}M = (1-0.00669438 \times \sin^2 \text{LAT\_}A)^{3/2}/6{,}335{,}439.327$$

$$\text{LON\_1}M = (1-0.00669438 \times \sin^2 \text{LAT\_}A)^{1/2}/(\cos \text{LAT\_}A \times 6{,}378{,}137.000)$$

Thus, the values of LAT_1M and LON_1M are calculated.

Next, assuming that, as shown in FIG. 3, the grain culm at reaping position (Xc, Yc) to be obtained is located at a position that is distant by A(m) from the vehicle position measuring point (X0, Y0) on the forward side of the vehicle body, and that the vehicle traveling direction tilts by θ(rad) relative to North, $$Xc = X0 + \text{LON\_1}M \times A \times \cos \theta$$

$$Yc = Y0 + \text{LAT\_1}M \times A \times \sin \theta$$

With this algorithm, the vehicle position measuring point (X0, Y0) is corrected to the accurate coordinate position (Xc, Yc) of the reaping point.

The reaping checker 632A receives a detection signal indicating the lowered state of the reaper 12 at the start of the harvesting operation from the device state detection sensor group 9, and outputs the first check signal indicating a reaping start timing. Furthermore, the reaping checker 632A receives a detection signal indicating the raised state of the reaper 12 at the end of the harvesting operation from the device state detection sensor group 9, and outputs the second check signal indicating a reaping end timing.

The unit yield corrector 633A employs the method described using FIG. 10. In this embodiment, the unit yield corrector 633A replaces a reaping-start unit yield, which is a unit yield based on grain culms that are reaped immediately after the reaping checker 632A outputs the first check signal, with a unit yield that is obtained subsequently to this reaping-start unit yield. That is to say, the reaping-start unit yield is corrected to the same value as the unit yield that is obtained subsequently to the reaping-start unit yield. Furthermore, the unit yield corrector 633A deems a unit yield that is measured when the reaping checker 632A outputs the second check signal as a reaping-end unit yield and discontinues the measurement thereof. The unit yield that came prior to the reaping-end unit yield is also used as the reaping-end unit yield. That is to say, the reaping-end unit yield is corrected to the same value as the unit yield that is measured prior to the reaping-end unit yield.

The taste calculator 65 calculates a taste value per minimal section (minimal section taste value), based on a measurement value from the taste measurement unit 4A.

The distribution data generator 66 includes a yield distribution data generator 661 for generating, based on the minimal section yield, yield distribution data that represents a yield distribution in the field, and a taste distribution data generator 662 for generating, based on the minimal section taste value, taste distribution data that represents a taste distribution in the field. At this time, an ID for identifying each minimal section, which are obtained by minutely dividing the field, is assigned to each minimal section yield and each minimal section taste value. Furthermore, the yield distribution data and the taste distribution data are integrated as harvest distribution data, which is temporarily recorded in a memory by the harvest information recorder 67. The recorded harvest distribution data is read out at an appropriate timing, and is displayed on the monitor 18 in the driving unit 13. The harvest distribution data is also transmitted to a management center 100, which is located at a remote place, through a communication line.

Here, a principle of the yield measurement performed by the yield measurement apparatus 3 will be described.

In an initial state where the reaping operation has not been started, the first shutter 33 assumes the open posture. After the reaping operation starts, when a timing at which grains are to be discharged to the grain tank 2 is reached, the first shutter 33 switches to the closed posture, and grains begin to accumulate in the yield measurement container 30. Simultaneously, the time calculator 62 starts measuring time (generation of a count signal). Upon the amount of grain accumulated in the yield measurement container 30 reaching a given amount, the proximity sensor 35 operates, and an appropriate amount detection signal is generated.

With the generation of this appropriate amount detection signal as a trigger, the time measurement performed by the time calculator 62 stops, and the first shutter 33 switches to the open posture. A time measurement value (accumulation time) obtained by the time calculator 62 is the time taken until the given amount of grain is accumulated in the yield measurement container 30. Here, assuming that the predetermined amount is q and the accumulation time is t, the yield per unit of time can be obtained by q/t. Furthermore, assuming that the vehicle speed when the grains to be accumulated are being harvested is v, the yield per unit of travel distance (unit yield) is obtained by q/(t*v). Also, assuming that the reaping width (harvesting width) of the reaper 12 is w, the yield per unit of travel area is obtained by q/(t*v*w), which will be referred to as the unit yield here. This is because, usually, the yield per unit of travel distance is normalized by the reaping width (harvesting width). Also, the width of each side of the minimal section is defined as an integral multiple of the reaping width (harvesting width). Accordingly, the minimal section yield is obtained by integrating the yields per unit of travel that are successively obtained during reaping operation travel. Note that, if one side of the minimal section, which is arranged in a matrix, is the reaping width (harvesting width) and the other side is the unit of travel distance, the minimal section yield coincides with the yield per unit of travel.

Similarly to the first shutter 33, in an initial state where the reaping operation has not started, the second shutter 43 assumes the open posture. After the reaping operation starts, when a timing at which grains are to be discharged to the grain tank 2 is reached, the second shutter 43 switches to the closed posture, and grains begin to accumulate in the taste measurement container 40. Simultaneously, the time calculator 62 starts measuring time. Upon the amount of grain accumulated in the taste measurement container 40 reaching a predetermined amount, the proximity sensor 45 operates, and an appropriate amount detection signal is generated.

With the generation of this appropriate amount detection signal as a trigger, taste measurement is started by the taste measurement unit 4A. A water content value and a protein value are measured through analysis of the wavelength of the light beam with which grains are irradiate. The measurement time required for the taste measurement is about several seconds to several tens of seconds. After the taste measurement ends, the second shutter 43 switches to the open posture, and the grains in the taste measurement container 40 are discharged from the taste measurement container 40 into the grain tank 2. Upon the grains having been discharged from the taste measurement container 40, the second shutter 43 switches to the closed posture based on an instruction from the taste calculator 65 to proceed to the next taste measurement.

If the area of the minimal section and the aforementioned unit of travel area are the same, the minimal section yield and the unit yield are the same. However, since the predetermined amount (the amount of grain to be accumulated) in the yield measurement container 30 is small, the area of a minimal section that serves as the basis of the yield distribution data is larger than the area of the unit of travel distance in many cases. In that case, the minimal section yield may be obtained by integrating a plurality of successively calculated unit yields. In the above embodiment, it is assumed that the area of each minimal section is the same as the aforementioned unit of travel area, i.e. the minimal section yield is the same as the unit yield, to simplify the description.

Figure 12:
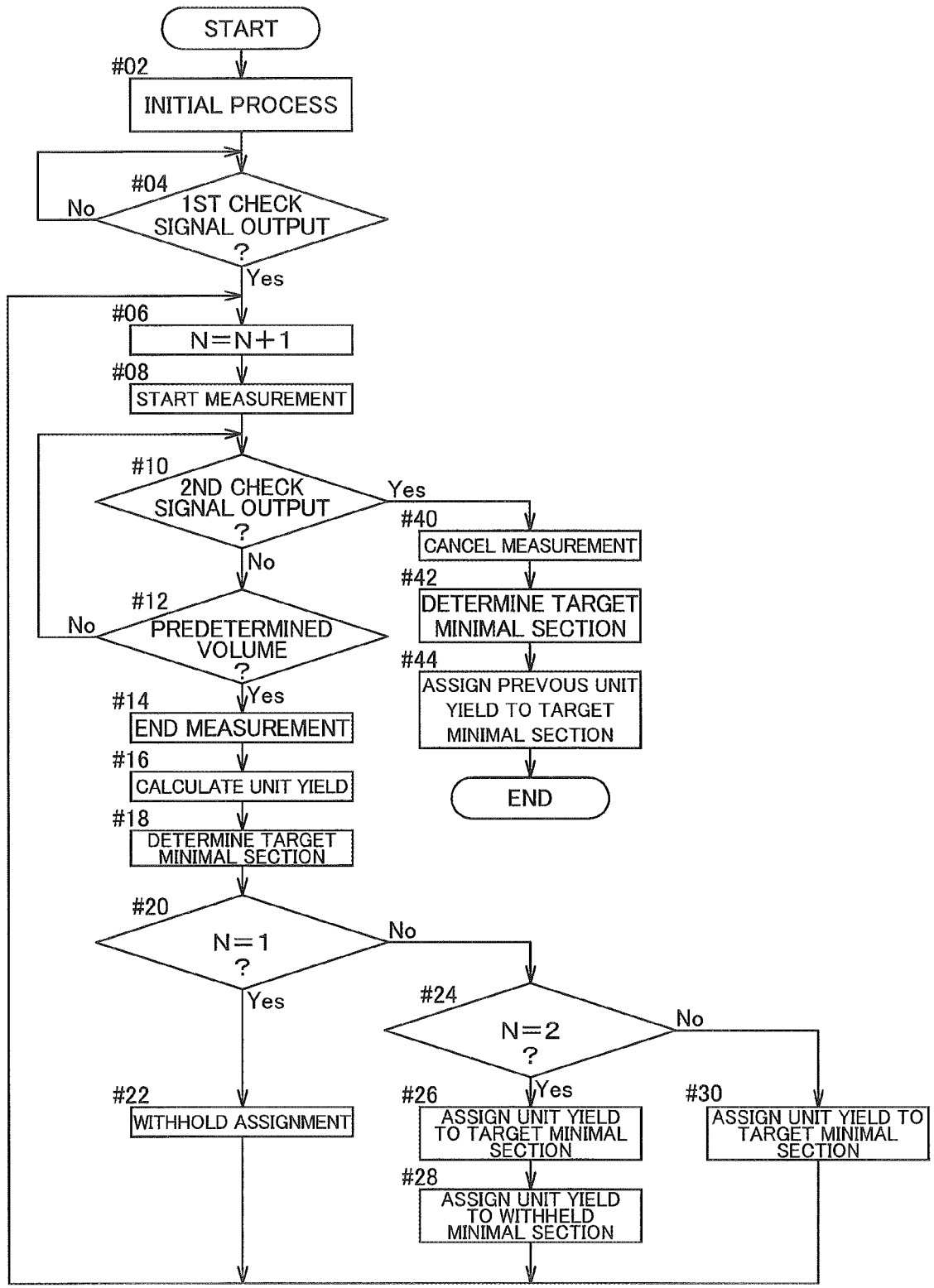
FIG. 12 is a flowchart showing an example of processing for assigning a yield to a minimal section, including unit yield correction at the start and end of reaping.

Next, a description will be given, using the flowchart in FIG. 12, of an example of processing for assigning a yield to a minimal section, including unit yield correction at the start and end of reaping for one line.

Upon a reaping operation control routine being started, a variable N is substituted by 0 as an initial process (#02). Whether or not the first check signal indicating the start of reaping has been output is checked (#04). If the first check signal has been output, N is incremented by 1 (#06), and the aforementioned yield measurement is started (#08). Furthermore, here, whether or not the second check signal indicating the end of reaping has been output is checked (#10). If the second check signal has not been output (#10: "No" branch), whether or not the predetermined volume of grains has been accumulated in the yield measurement container 30 is checked (#12). If the predetermined volume of grains has not been accumulated in the yield measurement container 30 (#12: "No" branch), the processing returns to step #10. If the predetermined volume of grains has been accumulated in the yield measurement container 30 (#12: "Yes" branch), yield measurement ends (#14). The unit yield is calculated as the yield measurement result at this time, based on the accumulation time obtained in this yield measurement and the vehicle speed of the combine harvester (#16). A target minimal section to which the obtained unit yield is to be assigned is determined by referencing vehicle position information and correction computation therefor (#18).

Here, the value of the variable N is checked (#20). If N=1 (#20: "Yes" branch), it indicates the yield measurement result at the start of reaping. Accordingly, assignment of this unit yield to the target minimal section is withheld (#22), the processing jumps to step #06 to perform the next yield measurement (second yield measurement), and the value of N is incremented by 1. After the second yield measurement has ended, the unit yield has been calculated, and the target minimal section thereof has been determined, the processing proceeds to the "No" branch in step #20 since the value of N has been incremented. Subsequently, whether or not N=2 is checked (#24). If N=2 (second yield measurement) (#24: "Yes" branch), the unit yield is assigned to the target minimal section (#26). Furthermore, this unit yield is also assigned to the minimal section regarding which the assignment was previously withheld (#28), and the processing jumps to step #06 to perform the next yield measurement. In the case of the third or subsequent yield measurement, the value of N is 3 or more. Accordingly, the processing proceeds to the "No" branch in step S24, the unit yield is only assigned to the target minimal section (#30), and the processing jumps to step #06 to perform the next yield measurement.

Note that, if the reaping has ended and the second check signal has been output, the processing proceeds to the "Yes" branch at the check in step #10, and the yield measurement that is being executed at this point is canceled (#40). Since the yield measurement is canceled, the unit yield, which is the yield measurement result, is zero. However, the target minimal section is determined, and the previous unit yield (which was calculated immediately before the second check signal was output) is assigned as the unit yield at the end of reaping to this target minimal section (#44), and this routine ends.

Variations of Second Embodiment

In the unit yield assignment control illustrated in the above flowchart, the initial unit yield is discarded at the start of reaping and is corrected so as to be complemented by the second unit yield. However, instead of this correction, a correction may also be employed in which the unit yields obtained through multiple yield measurements starting from the first yield measurement are discarded, and each of the discarded unit yields is complemented by the subsequent unit yield. The unit yield used for complementing may be not only a single unit yield obtained immediately after the unit yield(s) has been discarded, but also a unit yield obtained by averaging a plurality of unit yields obtained immediately after the unit yield(s) has been discarded. At the end of reaping as well, the unit yield used in the complementing may not only be the unit yield obtained immediately before the yield measurement is canceled, but also a unit yield obtained by averaging a plurality of unit yields obtained immediately before the yield measurement is stopped.

Variations Common to First and Second Embodiments (1) In the embodiments, the distribution data generator 66 handles not only the yield distribution data but also the taste distribution data. However, needless to say, the distribution data generator 66 generates only the yield distribution data in a combine harvester that does not perform taste calculation.

(2) In the embodiments, the distribution data generator 66 is configured as one of the ECUs mounted in the combine harvester. However, at least a portion of the distribution data generator 66 can also be configured to be an application program on a mobile communication terminal, which may be a portable control device such as a mobile PC that is removable from the combine harvester, a smartphone carried by an operator, or the like. The distribution data generator 66 can also be configured in a computer in the management center 100.

(3) In the embodiments, the yield measurement container 30 and the taste measurement container 40 are attached to the front wall 2a of the grain tank 2. However, these containers may also be attached to any of the other side walls.

(4) In the embodiments, the yield measurement container 30 and the taste measurement container 40 are each constituted by a tubular body having a rectangular cross section. However, these containers may also be tubular bodies having a cross section of any of other shape.

(5) In the embodiments, the grain supply passages to the yield measurement container 30 and the taste measurement container 40 are different. However, the yield measurement container 30 and the taste measurement container 40 may have a common grain supply passage thereof. Thus, the grain supply structure can be simplified.

(6) In the above embodiment, a normal combine harvester is dealt with as the combine harvester. However, needless to say, the present invention is also applicable to any other type of combine, such as a culm head charging type combine harvester.

Third Embodiment

Figure 13:
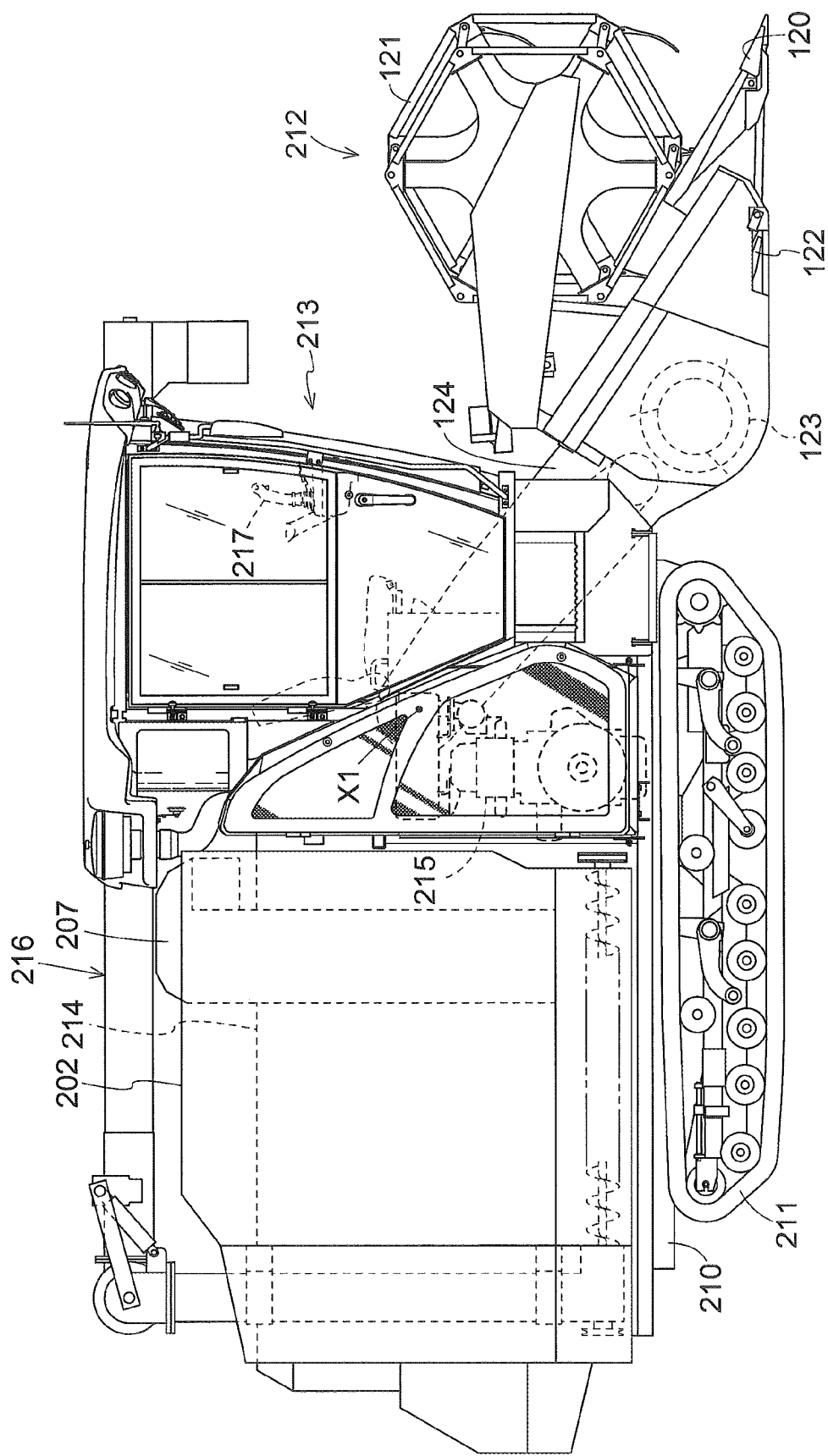
FIG. 13 is a diagram showing a third embodiment (the same applies to FIGS. 14 to 25), and is a right side view of a combine harvester.
Figure 14:
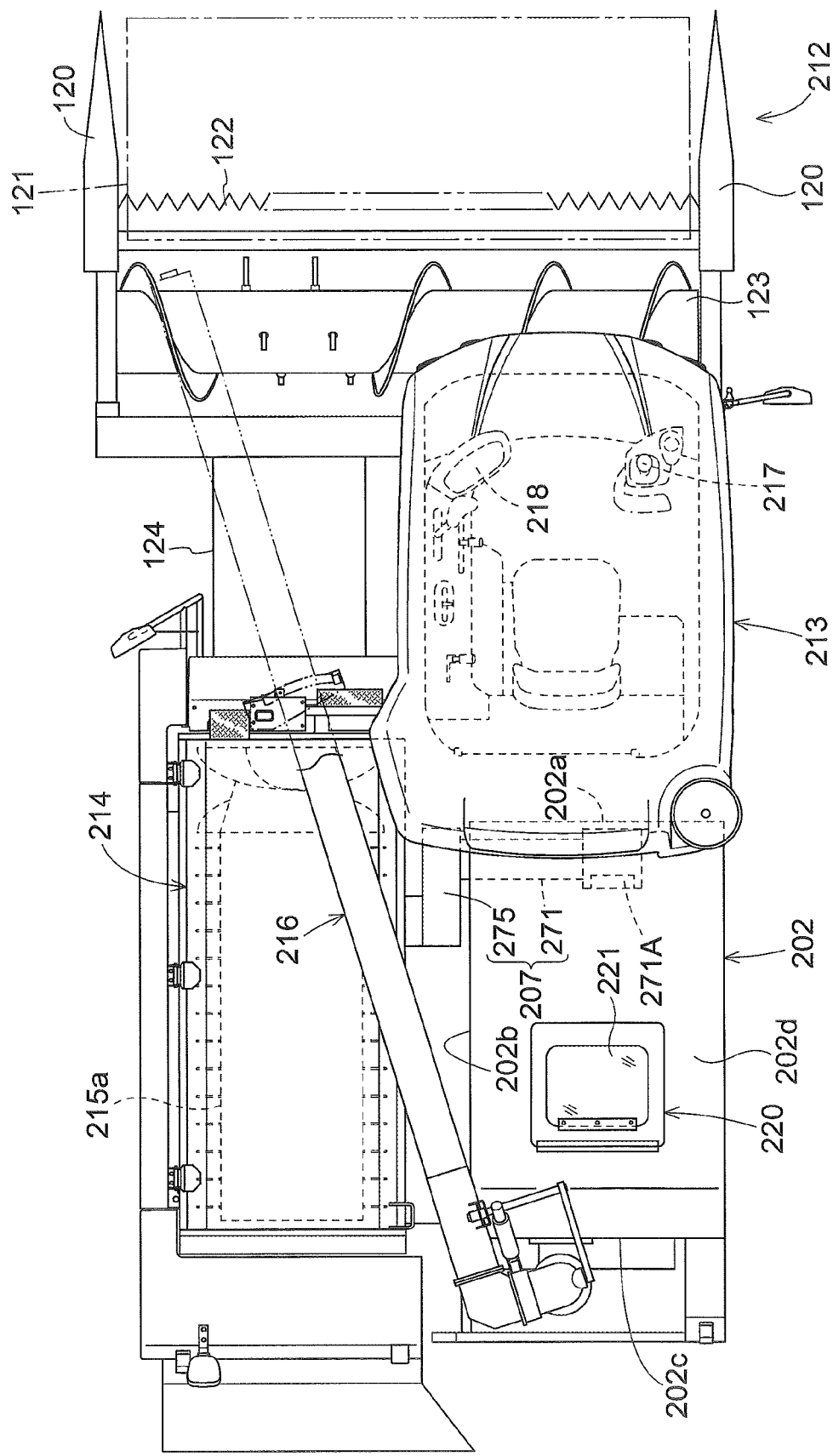
FIG. 14 is a plan view of the combine harvester.

FIG. 13 is a side view of a normal combine harvester, which is an example of a combine harvester, and FIG. 14 is a plan view thereof. This combine harvester includes a body frame 210, which is formed by connecting a plurality of steel materials such as channel-shaped materials and square pipe materials. A pair of left and right crawler traveling apparatuses 211 are installed below the body frame 210. An engine 215 is mounted on the front side of a right half portion of the body frame 210, and a driving unit 213, which is configured as a cabin, is formed thereabove.

An operation lever 217, a monitor 218, and the like are arranged in the driving unit 213. A reaper 212 is installed in a front portion of the body frame 210 so as to be able to be raised and lowered. A threshing apparatus 214 for threshing whole reaped grain culms that are supplied from the reaper 212 and then thrown therein, a grain tank 202 for accumulating grains supplied from the threshing apparatus 214 by a grain-lifting apparatus 207, and an unloader 216 for discharging the grains accumulated in the grain tank 202 to the outside are installed in a rear portion of the body frame 210.

The reaper 212 is configured to be able to be raised and lowered in an up-down direction around a first horizontal axis X1, which extends in a machine body-horizontal direction. The reaper 212 is in a raised state during a non-harvesting operation, such as when turning around, and is in a lowered state and comes close to the field surface during a harvesting operation. The reaper 212 includes a pair of left and right dividers 120 for dividing planted grain culms, a raking reel 121 for raking the planted grain culms rearward by being driven to rotate, a reaping blade device 122 for reaping the planted grain culms raked by the raking reel 121, an auger drum 123 for feeding the grain culms reaped by the reaping blade device 122 rearward, and a feeder 124 for conveying the reaped grain culms fed from the auger drum 123 toward a front end portion of the threshing apparatus 214.

The threshing apparatus 214 is configured to perform a threshing process on the reaped grain culms supplied from the feeder 124, using a cylinder 215a that is driven to rotate.

The grain tank 202 is arranged above a right-rear portion of the body frame 210, and is located on the right side of the threshing apparatus 214 and on the rear side of the driving unit 213. The grain-lifting apparatus 207, which functions as a supply pipe for supplying grains from the threshing apparatus 214 to the grain tank 202, is arranged between the threshing apparatus 214 and the grain tank 202.

The last stage of the grain-lifting apparatus 207 is configured as a screw conveyor 271 (which corresponds to a horizontal conveyor), and is inserted into the grain tank 202. Accordingly, grains conveyed by the grain-lifting apparatus 207 are discharged into the grain tank 202 from a discharge port 271A, which is formed at a leading end portion of the screw conveyor 271.

Incidentally, a check opening portion 220, which includes a transparent window portion 221 and allows the grain accumulation state inside thereof to be checked from the outside, is provided so as to be able to be pivoted to open and close, in a top plate portion 202d of the grain tank 202 (see FIG. 14).

Figure 25:
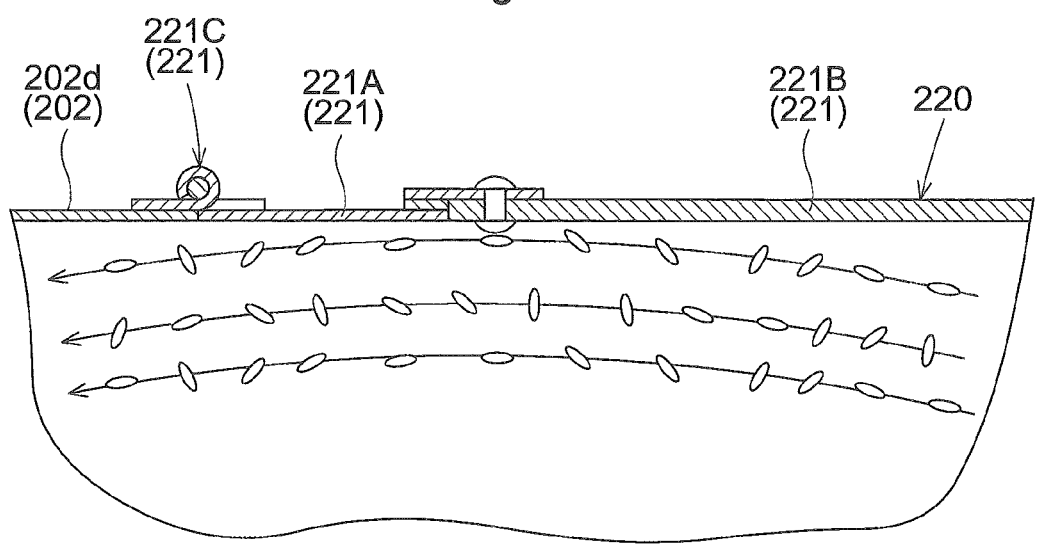
FIG. 25 is a cross-sectional view showing main part of a check opening portion of the grain tank.

As shown in FIG. 25, the transparent window portion 221 is configured by attaching a transparent synthetic resin plate 221B to a center opening of a metallic frame member 221A, and the frame member 221A is configured to be able to be opened and closed by being attached to the top plate portion 202d with a hinge 221C. Note that both lower faces of the frame member 221A and the synthetic resin 221B are formed into a flat surface so as to be the same flat face as a lower face of the top plate portion 202d. This configuration can prevent grains from abutting against the check opening portion 220 and getting stuck when the grains are thrown as will be described later, and is less likely to be an obstacle in the throwing of grains.

Figure 15:
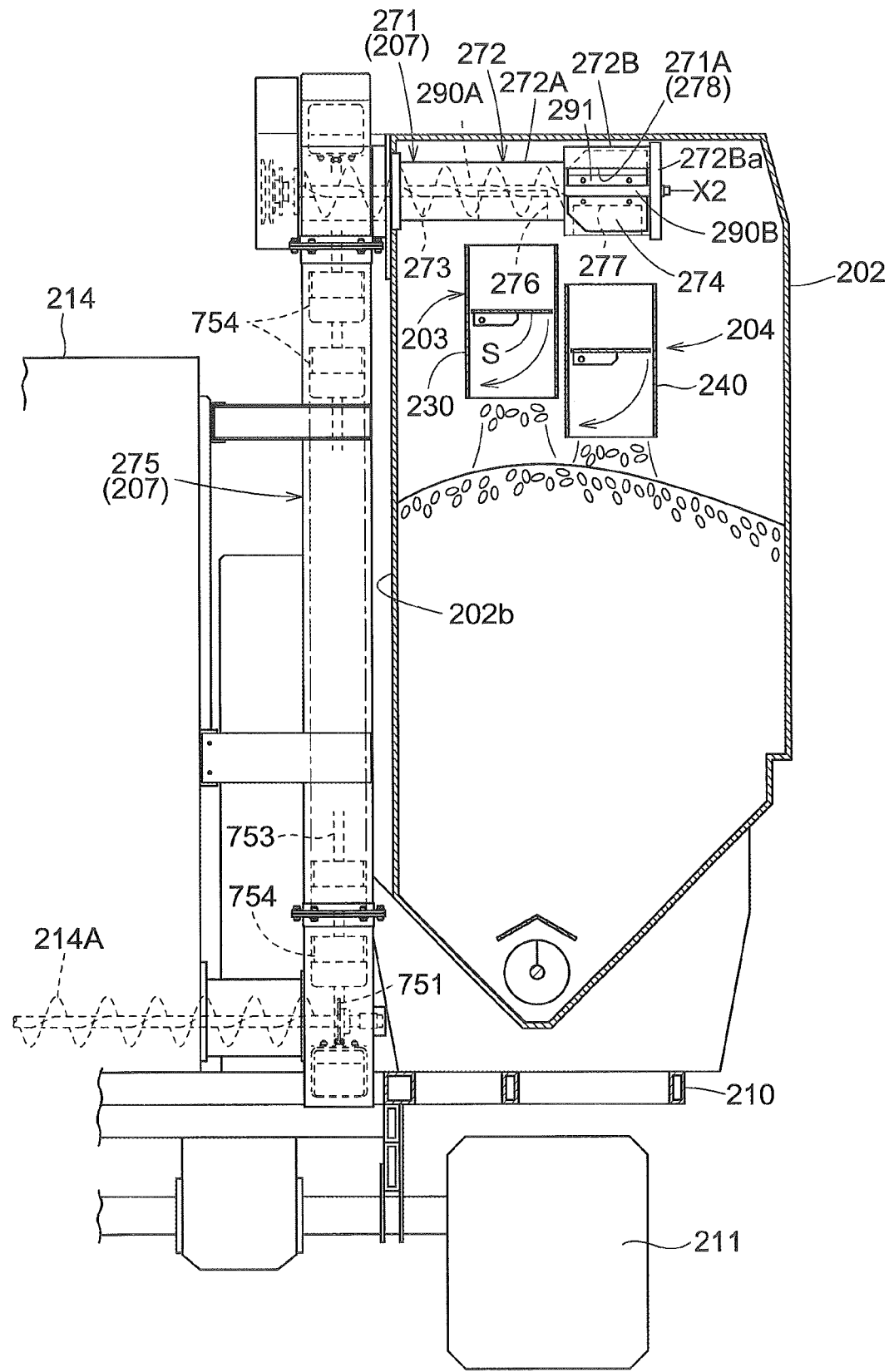
FIG. 15 is an illustrative diagram as viewed from the back side of the combine harvester, showing a state of a grain supply apparatus and a grain tank.
Figure 16:
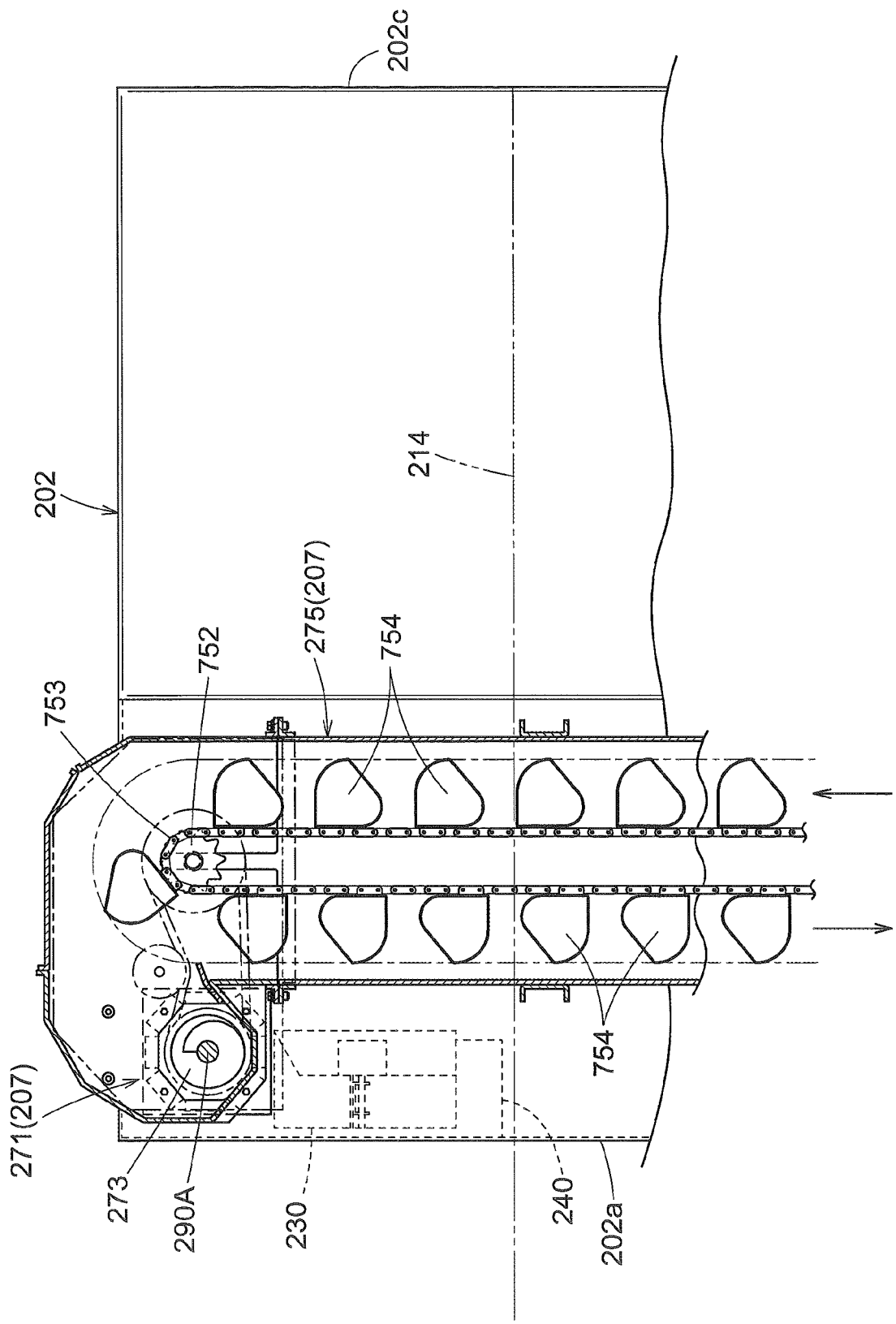
FIG. 16 is an illustrative diagram as viewed from the left side of the combine harvester, showing a state of the grain tank and a screw conveyor.

As shown in FIGS. 15 and 16, the grain-lifting apparatus 207 is constituted by a lifting conveyor 275 (which corresponds to a vertical conveyor) and the screw conveyor 271 (which corresponds to a horizontal conveyor).

A horizontal feed conveyor 214A, which is installed in the left-right direction at the bottom of the threshing apparatus 214, is connected, at its conveyance terminal portion, to the bucket-type lifting conveyor 275.

The lifting conveyor 275 is a bucket conveyor that extends upward and in which a plurality of buckets 754 are attached with fixed gaps to the peripheral side of an endless rotary chain 753 that is wound around a driving sprocket 751 and a driven sprocket 752. The lifting conveyor 275 is connected to the screw conveyor 271 at its conveyance terminal portion.

The screw conveyor 271 extends horizontally from an upper end portion of the lifting conveyor 275 and is inserted into an upper portion on the front side of a left wall 202b of the grain tank 202 (which is an example of "side wall of the grain tank"), and the peripheral portion of the screw conveyor 271 is enclosed by a casing 272 whose cross-sectional shape is octagonal (which may also have another polygonal shape or a circular shape). The screw conveyor 271 includes a screw portion 273 on a base end side that is close to the lifting conveyor 275, and blade portions 274 that are supported by a rotary shaft 290B extending from a screw shaft 290A of the screw portion 273 at a leading end side that is distant from the lifting conveyor 275, are provided so as to protrude in a radius direction from the rotary shaft 290B, and are rotated to throw grains from the discharge port 271A to the rear side in the grain tank 202.

The screw shaft 290A and the rotary shaft 290B are configured to rotate integrally around a second horizontal axis X2. In this embodiment, the rotation direction is set as leftward rotation with a visual axis extending along the second horizontal axis X2 from the base end side of the screw shaft 290A toward the leading end side thereof as a reference.

The casing 272 is configured to include a base end-side casing portion 272A that covers the screw portion 273, and a leading end-side casing portion 272B that is formed to have a larger diameter than that of the base end-side casing portion 272A and covers the blade portions 274.

Figure 21:
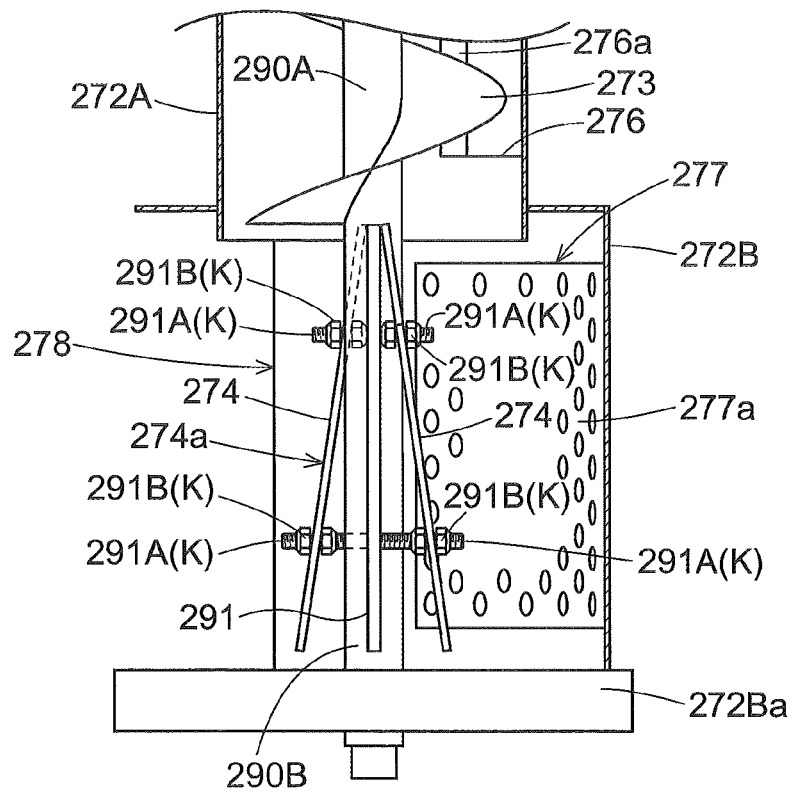
FIG. 21 is a plan view of the blade portion.
Figure 22:
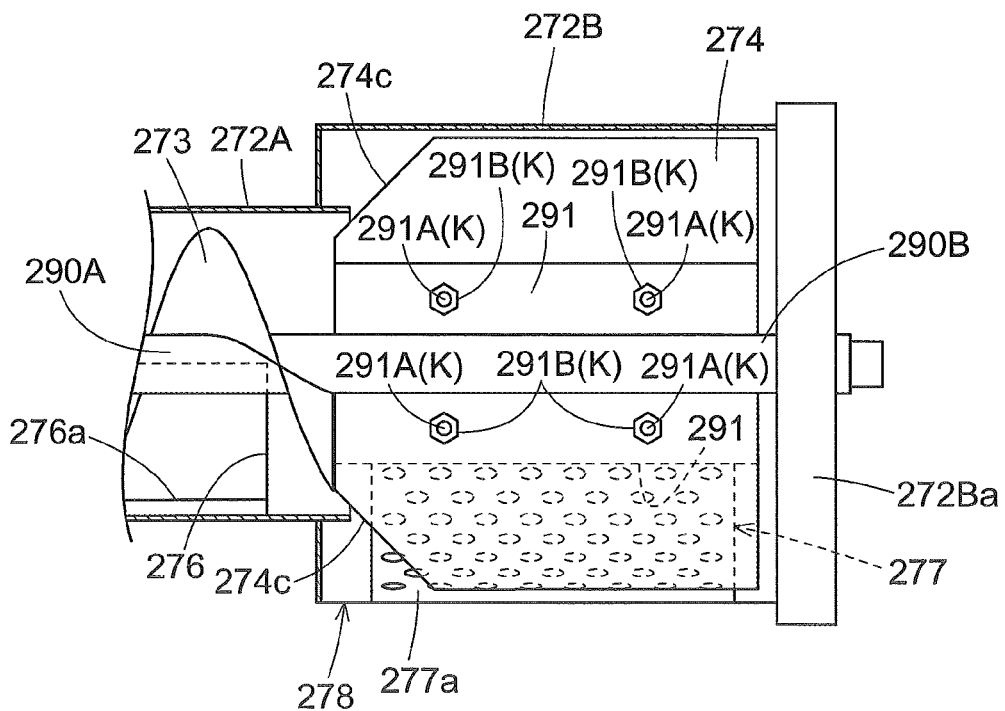
FIG. 22 is an illustrative diagram of the blade portion as viewed from the back side of the combine harvester.

At a connecting portion between the base end-side casing portion 272A and the leading end-side casing portion 272B, the base end-side casing portion 272A and the leading end-side casing portion 272B are connected in a state where the leading end portion of the base end-side casing portion 272A extends to the inside of the leading end-side casing portion 272B on the base end side (see FIGS. 21 and 22).

The leading end portion of the leading end-side casing portion 272B is blocked by a lid portion 272Ba, which also serves as a bearing for the rotary shaft 290B.

The casing 272 includes a first opening portion 276 (corresponding to an opening portion) in its intermediate portion in the longitudinal direction; and a second opening portion 277 and a third opening portion 278 (corresponding to the discharge port 271A) at its terminal portion (see FIG. 15).

Figure 17:
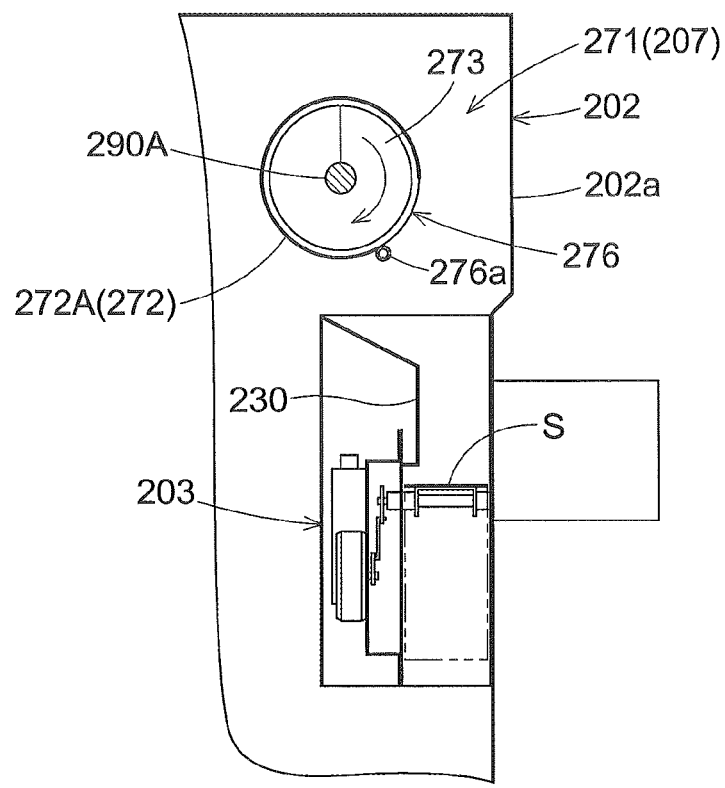
FIG. 17 is an illustrative diagram as viewed in a second horizontal axis direction, showing a state of the screw conveyor and a yield measurement apparatus.
Figure 19:
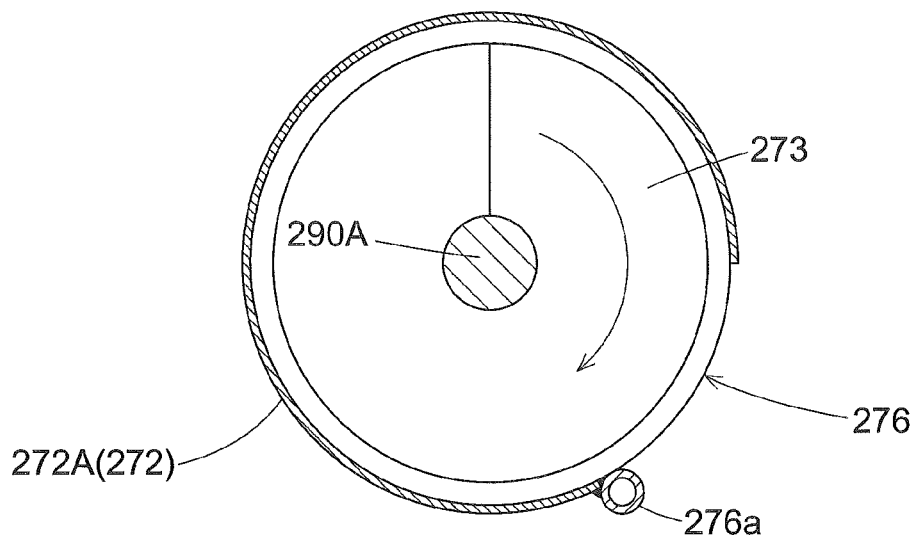
FIG. 19 is a horizontal cross-sectional view of a screw portion.

As shown in FIGS. 15, 17, and 19, the first opening portion 276 is located in a portion on the base end-side casing portion 272A on the leading end side relative to the center thereof, and its circumferential portion on the front wall 202a side of the grain tank 202 in the casing circumferential direction is open (see FIGS. 17 and 19).

Note that a yield measurement apparatus 203 for measuring the yield of grains is provided below the first opening portion 276 (see FIGS. 15 and 17), and is configured to be able to temporarily accumulate grains that fall down through the first opening portion 276 in a yield measurement container 230 in the yield measurement apparatus 203, and calculate the yield per unit of section of the field based on the time required for the amount of accumulated grains to reach a predetermined amount. The yield measurement apparatus 203 is provided with a weight sensor S (an example of a sensor) to detect a state (an example of a grain state) where the amount of accumulated grains has reached the predetermined amount.

A lower edge portion, of an opening edge portion, of the first opening portion 276 is formed as a curved surface without a corner. In this embodiment, a round pipe 276a is fixed along the lower edge portion of the opening edge portion, and a peripheral curved surface of the round pipe 276a is used (see FIGS. 17 and 19).

Rachises and branches that could not be removed by the threshing apparatus 214 may be mixed in grains conveyed by the screw conveyer 271. These rachises and branches may be stuck at the lower edge portion of the first opening portion 276 due to the rotation of the screw shaft 290A, and the lower edge portion formed as a curved surface is effective in prevention thereof.

Figure 18:
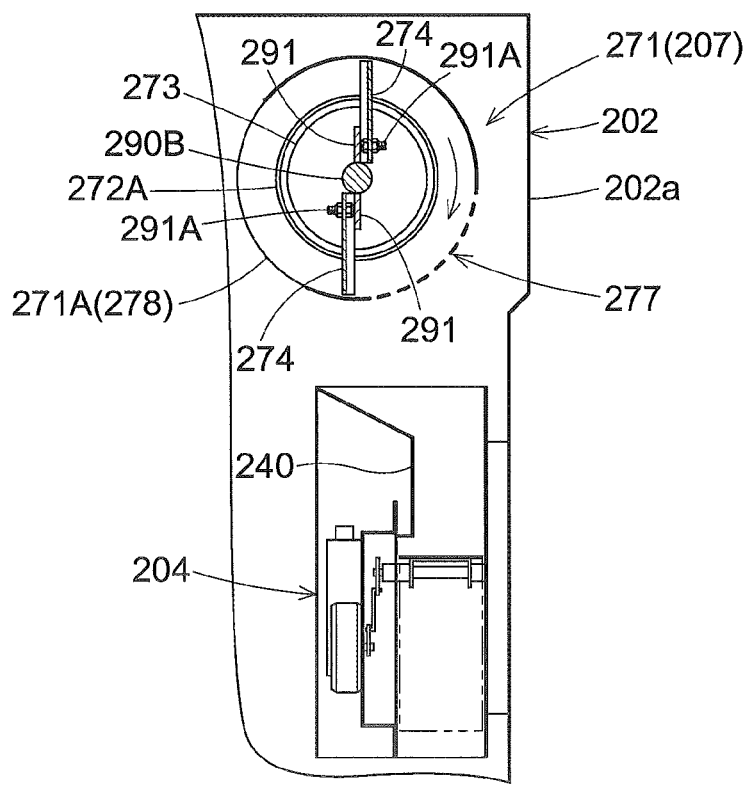
FIG. 18 is an illustrative diagram as viewed in the second horizontal axis direction, showing a state of the screw conveyor and a taste measurement apparatus.
Figure 20:
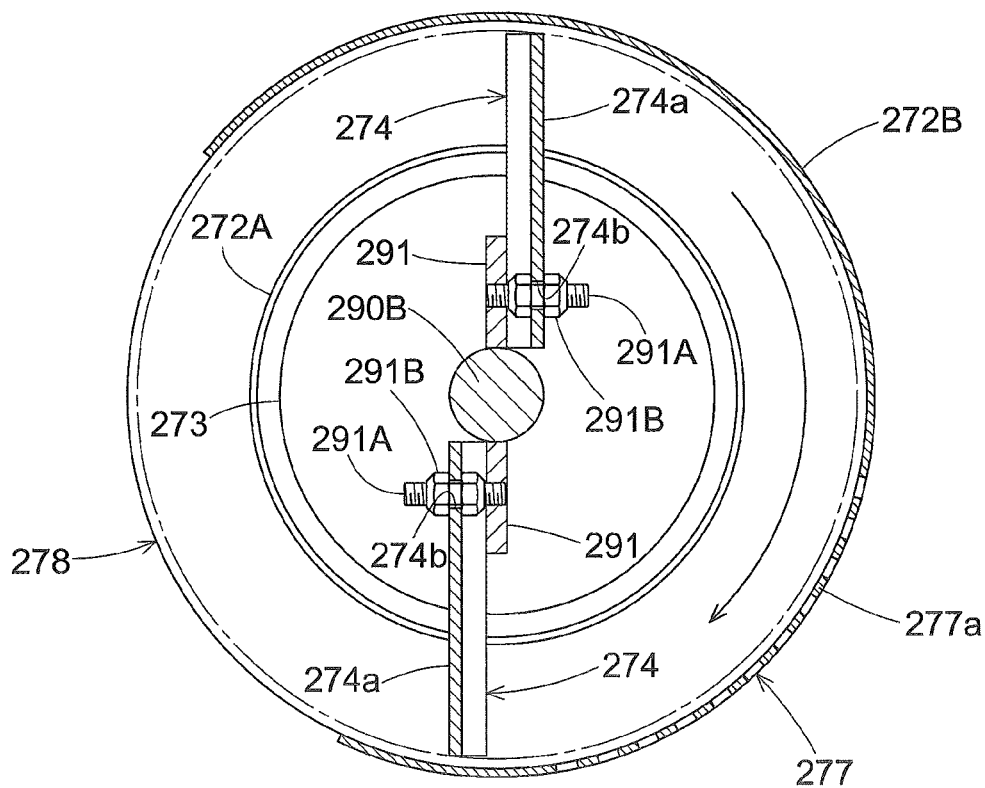
FIG. 20 is a horizontal cross-sectional view of a blade portion.

As shown in FIGS. 15, 18, and 20, the second opening portion 277 is located in an intermediate portion of the leading end-side casing portion 272B in the longitudinal direction, and its circumferential portion that is in a lower half circumferential portion in the casing circumferential direction and on the front wall 202a side of the grain tank 202 is open (see FIG. 18).

A punched piece of metal 277a, through which grains can pass, is provided over the entire opening of the second opening portion 277, and is configured so that only grains fall down whereas rachises and branches are blocked.

Note that a taste measurement apparatus 204 for measuring the taste of grains is provided below the second opening portion 277 (see FIGS. 15 and 18), and is configured to temporarily accumulate grains that fall down through the second opening portion 277 in a taste measurement container 240 in the taste measurement apparatus 204, and measures grain components such as water content and protein through spectral measurement of the grains.

Figure 23:
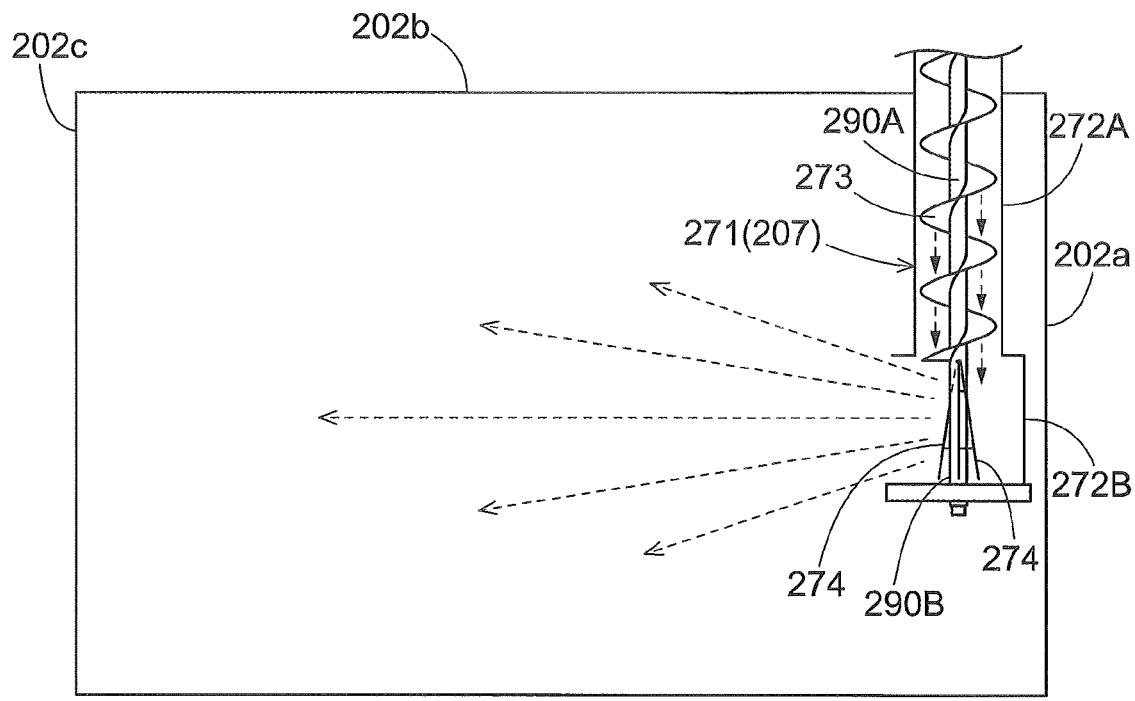
FIG. 23 is a schematic plan view showing a throwing state within the grain tank.

As shown in FIGS. 15, 18, and 20 to 22, the third opening portion 278 is formed so that its circumferential portion on a rear wall 202c side of the grain tank 202 in the casing circumferential direction is open throughout substantially the whole length of the leading end-side casing portion 272B in the longitudinal direction (see FIGS. 18, 20, and 23). The third opening portion 278 faces the blade portions 274 (see FIGS. 21 to 23), and can discharge grains toward the rear wall 202c of the grain tank 202 by throwing grains using throwing faces 274a of the blade portions 274.

As shown in FIGS. 20 to 22, the blade portions 274 are removably attached to the rotary shaft 290B via stay portions 291, which are provided integrally with a peripheral portion of the rotary shaft 290B.

Each stay portion 291 is constituted by a rectangular metal plate with its long side parallel to the longitudinal direction of the rotary shaft 290B. Each stay portion 291 is fixed to two portions of a circumferential face of the rotary shaft 290B that are separate by 180 degrees in the circumferential direction, so that its short side protrudes in the radius direction of the rotary shaft 290B.

Two stud bolts 291A are fixed, with a gap therebetween in the longitudinal direction, to respective faces of the stay portions 291 that face forward in the rotation direction of the rotary shaft 290B (see FIGS. 20 and 21). These stud bolts 291A are inserted into insertion holes 274b that are formed in the blade portions 274, and the blade portions 274 are held by two nuts 291B, and thus, the blade portions 274 can be supported by the stay portions 291.

Note that, since the blade portions 274 are attached to the stay portions 291 with their throwing faces 274a facing forward in the rotation direction of the rotary shaft 290B, the stay portions 291 are located on the side opposite to the throwing faces 274a relative to the blade portions 274.

The space between each stay portion 291 and the corresponding blade portion 274 can be adjusted by changing the threading position of the nuts 291B on the stud bolts 291A. Also, each blade portion 274 can be supported in a tilted posture relative to the stay portion 291 by making the threading positions of the nuts 291B on the two stud bolts 291A different.

In this embodiment, the blade portions 274 are attached so that the throwing faces 274a slightly tilt in a state of facing the left side wall 202b side relative to the directly rearward direction of the grain tank 202.

An angle adjuster K is constituted by the stud bolts 291A and the nuts 291B (see FIG. 21).

The blade portions 274 are attached to the stay portion 291 at the two positions in a tilted manner as described above. As shown in FIG. 22, each blade portion 274 is constituted by a substantially rectangular metal plate having a chamfered portion 274c at a corner of the peripheral portion thereof on the screw portion 273 side.

In a state where the blade portions 274 are attached to the stay portions 291, the outer diameter size of each blade portion 274 is larger than the outer diameter size of the screw portion 273.

A portion of each blade portion on the inner diameter side relative to the chamfered portion 274c (end portion of each blade portion 274 on the screw portion 273 side) is inserted into the leading end portion of the base end-side casing portion 272A.

With the above-described configuration, as shown in FIG. 23, horizontal conveyance of grains using the screw portion 273 and rearward throwing of grains using the blade portions 274 can be continuously carried out by rotating the screw shaft 290A and the rotary shaft 290B.

Figure 24:
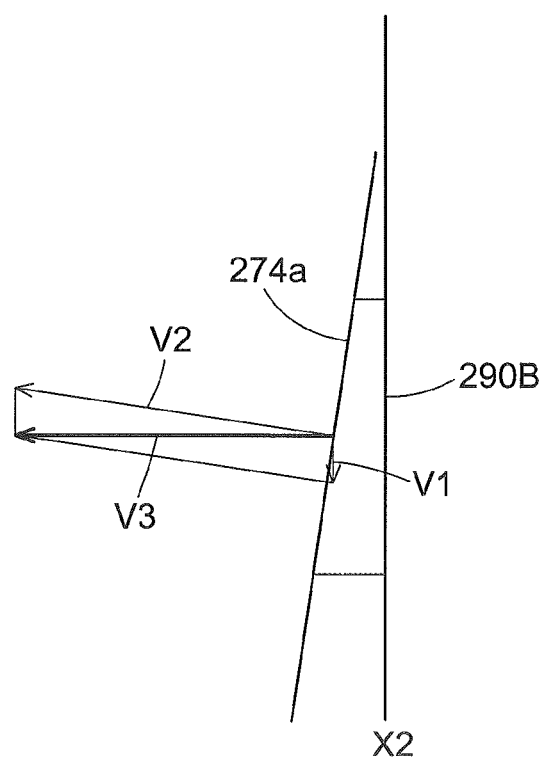
FIG. 24 is an illustrative diagram showing velocity vectors that are exerted on grains.

At this time, it is conceivable that velocity vectors illustrated in FIG. 24 are exerted on grains.

That is to say, a velocity vector V1 (parallel to the direction of the second horizontal axis X2), which is generated due to horizontal conveyance by the screw portion 273, and a velocity vector V2 (parallel to the perpendicular direction of each throwing face 274a), which is generated due to throwing by each blade portion 274, are exerted, and the grain throwing direction is the direction of a velocity vector V3, which is the resultant force of these velocity vectors V1 and V2.

Accordingly, in the combine harvester according to this embodiment, each throwing face 274a is slightly tilted so as to face the left side wall 202b side of the grain tank 202, thereby directing the velocity vector V3 toward the width-center side of the grain tank 202 and enabling grains to be thrown in this direction. As a result, grains can be distributed in a less one-sided manner within the grain tank 202.

Variations of Third Embodiment (1) As has been described in the above embodiment, the screw conveyor 271 (horizontal conveyor) is not limited to one that is inserted into the upper portion on the front side of the left side wall 202b of the grain tank 202, and may also be inserted into an upper portion on the rear side of the left side wall 202b, for example.

In the case of a combine harvester in which the grain tank 202 is arranged to the left side of the threshing apparatus 214, the screw conveyor 271 (horizontal conveyor) is inserted in a right side wall of the grain tank 202.

(2) The configuration of the blade portions 274 is not limited to one in which the blade portions 274 are attached to the rotary shaft 290B via the stay portions 291, and the blade portions 274 may also be directly attached to the rotary shaft 290B, for example.

The settings of the shape and size of the blade portions 274 are not limited to those in the above embodiment. For example, the shape may be square or any shape other than a rectangle. The blade portions 274 may not include the chamfered portion 274c. Regarding the size settings, the outer diameter size of each blade portion 274 may also be the same (or substantially the same) as the outer diameter of the screw portion 273.

(3) The structure of the angle adjuster K is not limited to the structure described in the above embodiment, and any known posture change mechanism may alternatively be employed.

Otherwise, a configuration may also be employed in which the angle adjuster K itself is not provided, and the tilt angle of the blade portion 274 cannot be adjusted. (4) This combine harvester can also be applied to a culm head charging type combine harvester, instead of a normal combine harvester.

INDUSTRIAL APPLICABILITY

The present invention is applicable to various kinds of combine harvesters that include a grain tank for storing grains that are obtained by threshing grain culms reaped from a field while traveling.

DESCRIPTION OF REFERENCE SIGNS

First Embodiment

2: Grain tank
7: Conveyance mechanism
30: Yield measurement container
340: Measurer
631: Yield assignment calculator
632: Grain conveyance state detector
633: Yield corrector
661: Yield distribution data generator Second Embodiment 2: Grain tank
12: Reaper
14: Thresher
30: Yield measurement container
340: Measurer
631A: Yield assignment calculator
632A: Reaping checker
633A: Unit yield corrector Third Embodiment 202: Grain tank
202b: Left side wall (side wall of grain tank)
207: Grain-lifting apparatus
214: Threshing apparatus
271: Screw conveyor (horizontal conveyor)
271A: Discharge port
272: Casing
272A: Base end-side casing portion
272B: Leading end-side casing portion
273: Screw portion
274: Blade portion
274a: Throwing face
274b: Insertion hole
274c: Chamfered portion
275: Lifting conveyor (vertical conveyor)
276: First opening portion (opening portion)
290A: Screw shaft
290B: Rotary shaft
291: Stay portion
K: Angle adjuster
S: Weight sensor (sensor)

What is claimed is:

1. A combine harvester comprising:
a thresher for threshing grain culms reaped from a field;
a conveyance mechanism for conveying grains obtained by the thresher to a grain tank;
a measurer for measuring an amount of grain conveyed to the grain tank as a conveyed yield;
a yield assignment calculator for calculating a minimal section yield, which is a yield per minimal section, by assigning the conveyed yield to a minimal section of the field;
a grain conveyance state detector for detecting a grain conveyance state of the conveyance mechanism;

a yield corrector for correcting, in accordance with the grain conveyance state, the minimal section yield after the minimal section yield is calculated by the yield assignment calculator; and a yield distribution data generator for generating yield distribution data representing a yield distribution in the field, based on the minimal section yield.

2. The combine harvester according to claim 1, wherein the grain conveyance state detector detects a drop in a conveyance speed of the conveyance mechanism and restoration from the drop in the conveyance speed, and the yield corrector corrects a decrease in the minimal section yield due to the drop in the conveyance speed and an increase in the minimal section yield due to the restoration from the drop in the conveyance speed.

3. The combine harvester according to claim 2, wherein the yield corrector corrects the decrease in the minimal section yield and the increase in the minimal section yield, using an average minimal section yield obtained by averaging the decreased minimal section yield and the increased minimal section yield.

4. The combine harvester according to claim 1, wherein the yield assignment calculator has a delay correction function of correcting a delay time occurring between a grain culm reaping position and the measurer, and a position shift correction function of correcting a position shift between the grain culm reaping position and a vehicle position measuring point obtained through satellite navigation.

5. The combine harvester according to claim 1, wherein the measurer calculates the conveyed yield per unit of travel, based on an accumulation time required to accumulate a predetermined volume of grain, and a vehicle speed.

6. The combine harvester according to claim 5, further comprising:

a yield measurement container for temporarily accumulating at least some of the grains supplied to the grain tank, wherein the measurer measures the accumulation time using the yield measurement container.

* * * * *